US012791665B2

(12) United States Patent
Yanik

(10) Patent No.: US 12,791,665 B2
(45) Date of Patent: Nov. 10, 2026

(54) FREQUENCY MODULATED CONTINUOUS WAVE RADAR SYSTEM WITH OBJECT CLASSIFIER

(71) Applicant: Texas Instruments Incorporated, Dallas, TX (US)

(72) Inventor: Muhammet Yanik, Plain City, UT (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 477 days.

(21) Appl. No.: 18/457,346

(22) Filed: Aug. 29, 2023

(65) Prior Publication Data

US 2024/0134008 A1 Apr. 25, 2024
US 2024/0230841 A9 Jul. 11, 2024

Related U.S. Application Data

(60) Provisional application No. 63/418,127, filed on Oct. 21, 2022.

(51) Int. Cl.

*G01S 7/41* (2006.01)
*G01S 13/58* (2006.01)
*G01S 13/72* (2006.01)
*G01S 7/35* (2006.01)

(52) U.S. Cl.

CPC ............ *G01S 7/415* (2013.01); *G01S 13/584* (2013.01); *G01S 13/726* (2013.01); *G01S 7/356* (2021.05)

(58) Field of Classification Search

CPC ...... G01S 7/415; G01S 13/584; G01S 13/726; G01S 7/356; G01S 7/354; G01S 7/414; G01S 13/343; G01S 13/589; G01S 13/42; G01S 13/931

See application file for complete search history.

(56) References Cited

U.S. PATENT DOCUMENTS

2009/0012398 A1* 1/2009 Zhang ................. G01S 7/52077 600/453
2021/0117659 A1* 4/2021 Foroozan ............... G06V 10/25
2023/0068523 A1* 3/2023 Santra ...................... G01S 7/415
2023/0090211 A1* 3/2023 Alsindi ................... G01S 13/62 342/114

* cited by examiner

*Primary Examiner* — Brady W Frazier
*Assistant Examiner* — Juliana Cross
(74) *Attorney, Agent, or Firm* — Michael T. Gabrik; Charles F. Koch

(57) ABSTRACT

In described examples, a method of operating a frequency modulated continuous wave (FMCW) radar system includes the following steps. A signal is received. A range Fast Fourier Transform (FFT), a Doppler FFT, and an angle FFT are performed on the signal to generate a radar cube. A point cloud is detected corresponding to the radar cube. Multiple objects corresponding to the point cloud are tracked to generate, for respective ones of the tracked objects, a centroid, a boundary, and a track velocity. For respective ones of the tracked object, a micro-Doppler spectrogram and a micro-range spectrogram are generated. The tracked objects are classified based on corresponding micro-Doppler spectrograms and micro-range spectrograms. In some examples, one dimensional feature vectors are extracted from spectrograms and used for training and classification. In some examples, spectrograms are circularly shifted around a track velocity, or a mean or median frequency, prior to feature extraction.

20 Claims, 19 Drawing Sheets

FREQUENCY MODULATED CONTINUOUS WAVE RADAR SYSTEM WITH OBJECT CLASSIFIER

CROSS-REFERENCE TO RELATED APPLICATION

This application claims the benefit of and priority to U.S. Provisional Application No. 63/418,127, filed Oct. 21, 2022, which is incorporated herein by reference.

TECHNICAL FIELD

This application relates generally to frequency modulated continuous wave (FMCW) radar, and more particularly to classification of objects tracked using an FMCW radar.

BACKGROUND

An FMCW radar transmits an electromagnetic radiation (EMR) signal with a known frequency that is modulated to vary up and down over time. The radar receives a reflected signal corresponding to the transmitted signal and uses the received signal to determine presence, distance, angle of arrival, speed, and direction of movement of objects within a detection distance limit of the FMCW radar. Speed and direction of movement together correspond to a velocity of a detected object.

An object corresponding to received reflected signals may be detected using a detection process and tracked using a tracking process. Using the detection and tracking processes, information regarding the object can be extracted from the received reflected signals to train an object classifier, or to classify objects corresponding to received reflected signals using a pretrained classifier.

Radar sensors used to capture signal information to perform object detection and classification may be used in various environments, e.g., automotive, industrial, and buildings. Internet of things (IoT) sensors are becoming more common in buildings for uses such as safety (e.g., smoke or carbon monoxide detectors), heating, ventilation, and air conditioning (HVAC), security, comfort, and entertainment. For example, a sensor can detect motion or occupancy for an HVAC system, and the HVAC system can control temperature or air flow based on whether motion or occupancy has been detected. If a room is unoccupied, the HVAC system can conserve energy by reducing airflow to the room. As another example, a sensor can detect motion for a security system so that the security system can determine whether the building is occupied.

Within this context, embodiments of the disclosure arise.

SUMMARY

In described examples, a method of operating a frequency modulated continuous wave (FMCW) radar system includes the following steps. A signal is received. A range Fast Fourier Transform (FFT), a Doppler FFT, and an angle FFT are performed on the signal to generate a radar cube. A point cloud is detected corresponding to the radar cube. Multiple objects corresponding to the point cloud are tracked to generate, for respective ones of the tracked objects, a centroid, a boundary, and a track velocity. For respective ones of the tracked objects, a micro-Doppler spectrogram and a micro-range spectrogram are generated. The tracked objects are classified based on corresponding micro-Doppler spectrograms and micro-range spectrograms. In some examples, one dimensional feature vectors are extracted from spectrograms and used for training and classification. In some examples, spectrograms are circularly shifted around a track velocity, or a mean or median frequency, prior to feature extraction.

DETAILED DESCRIPTION

Figure 1:
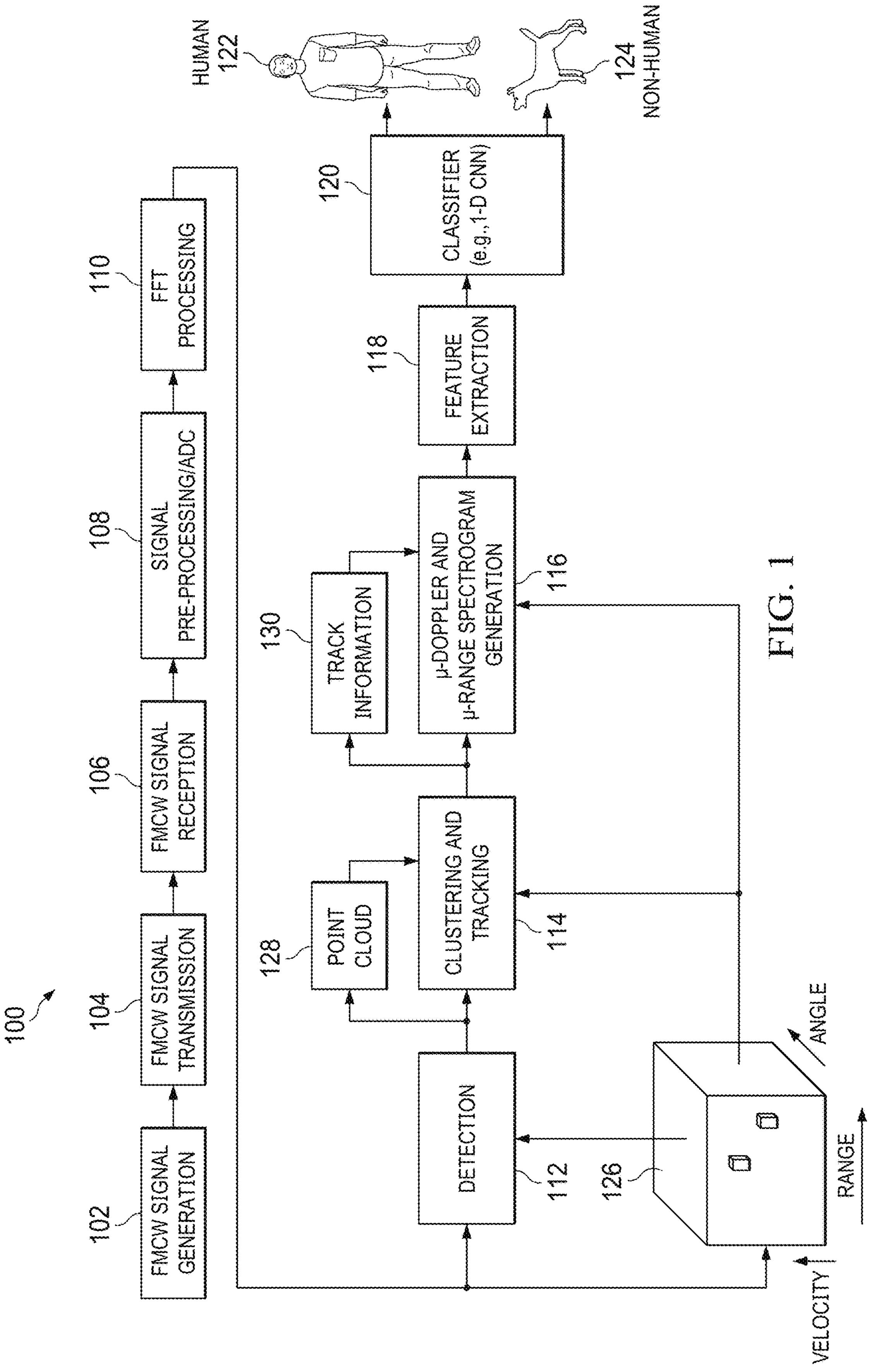
FIG. 1 is an example process for using FMCW signal information to track and classify multiple objects in range, and within a field of view, of an FMCW transmitter and corresponding FMCW receiver.

Herein, some structures or signals that are distinct but closely related have reference numbers that use a [number] [letter] format, such as transmitters 306*a*, 306*b*, and 306*c*, and receivers 410*a*, 410*b*, 410*c*, and 410*d*. In some examples, these structures or signals are referred to generally, in the singular or as a group, using the [number] and without the [letter], such as the transmitters 306 and the receivers 410. Also, the same reference numbers or other reference designators are used in the drawings to designate features that are closely related structurally and/or functionally.

Herein, reference to transmitters and receivers refers to corresponding transmitting or receiving antennas. In some examples, antennas are located separately (such as on a different portion of a printed circuit board (PCB) from, and are electrically connected to, integrated circuits (ICs) that contain other portions of respective transmitter-related and receiver-related structure. In some examples, antennas may be external to the PCB on which the transmitter-related and receiver-related structure are formed.

Figure 3A:
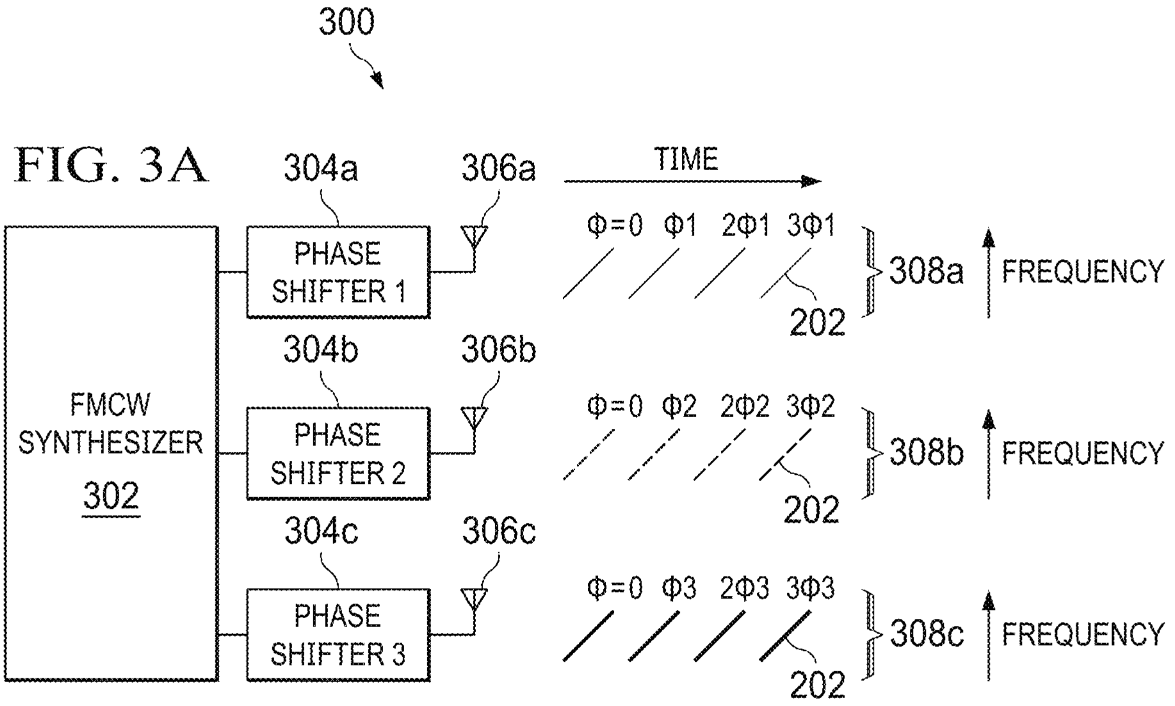
FIG. 3A is a diagram of an example Doppler division multiple access (DDMA) FMCW transmission.
Figure 3B:
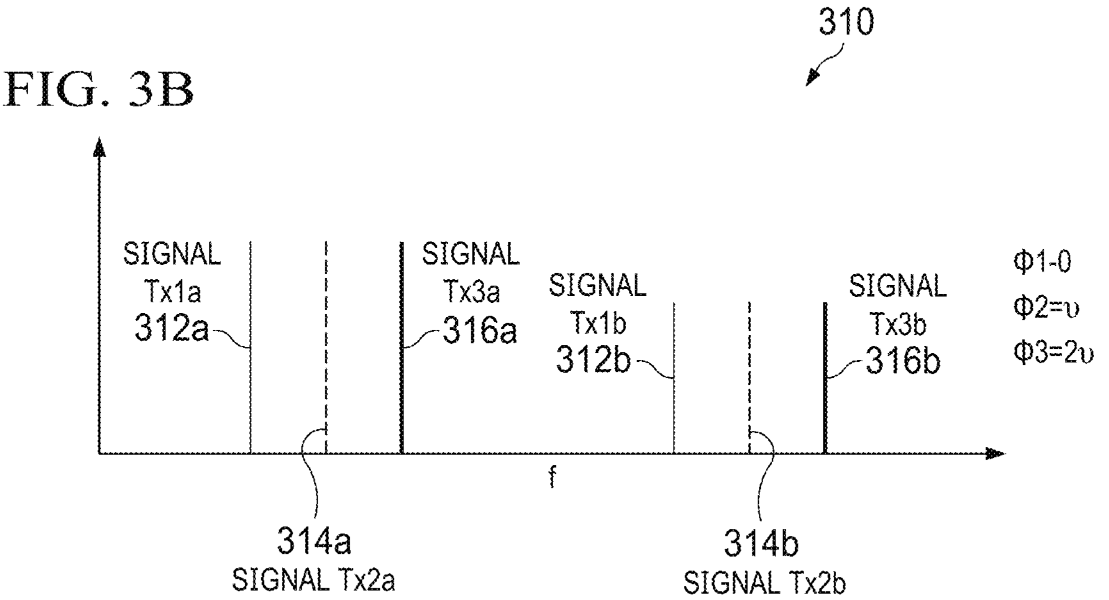
FIG. 3B is a graph of an example received reflected FMCW signal corresponding to the DDMA FMCW transmission of FIG. 2A.
Figure 4:
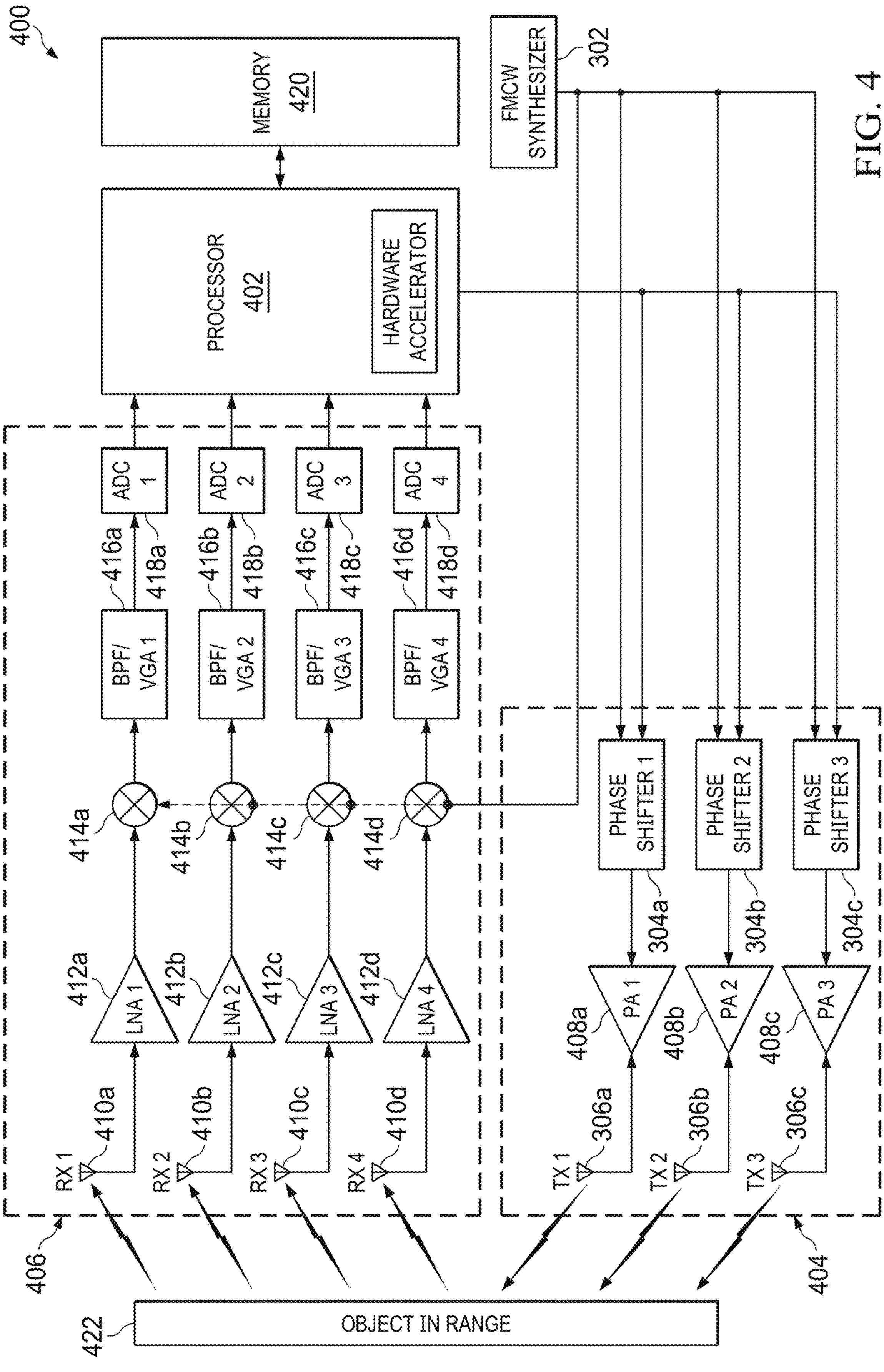
FIG. 4 is a functional block diagram of an example FMCW radar system for transmitting a DDMA FMCW transmission as shown in FIG. 3A, and receiving reflected FMCW chirps as shown in FIG. 3B.

FIG. 1 is a process 100 for using FMCW signal information to track and classify multiple objects in range, and within a field of view (FOV), of an FMCW transmitter 306 (see FIG. 3) and corresponding FMCW receiver 410 (see FIG. 4). In some examples, the process 100 is used to track and classify one or more objects in range 422 of the FMCW transmitter 306 and corresponding FMCW receiver 410. Herein, object in range refers to an object that is both within a shared FOV of FMCW transmitters 306 and corresponding FMCW receivers 410, and within a designed range over which a corresponding FMCW radar system (such as the FMCW radar system 400 of FIG. 4) can detect objects using received reflected FMCW signals.

Once an object is detected, a sensor processing system can classify the type of object based on signals received by the sensor from the object. For example, the sensor processing system can classify the object based on its location, size, velocity, or other characteristics of the object. Common classification categories are person, animal, vegetation, furniture, vehicle, wall, street curb, and so on. An accurate classification can be used by the sensor processing system to control another system or a machine. For example, an advanced driver assistance system can control a vehicle based on the classification of an object near the travel path of the vehicle. As an additional example, an HVAC system can generate heat or cooling based on whether an object is classified as a person, an animal, a plant, furniture, or a fan.

In step 102, FMCW signals are generated. In step 104, the FMCW signals are transmitted into the shared FOV of the FMCW transmitter 306 and FMCW receiver 410. In step 106, the FMCW receiver 410 receives signals reflected by one or more objects in range 422 of the FMCW transmitter 306 and receiver 410 that are within the FOV. In step 108, signal pre-processing is performed on the received reflected signals, and the pre-processed signals are provided to an analog-to-digital converter (ADC) circuit 418 to generate digitized signal data. Steps 102 through 108, and corresponding structures, are further discussed with respect to FIGS. 2 through 5.

Steps 110 through 120 are performed by a processing circuit, such as processor 402. In step 110, the processing circuit performs fast Fourier transforms (FFT) on the digitized signal data to extract range data (range FFT), Doppler data (Doppler FFT), and angle data (angle FFT). FFT is a type of spectral estimation; in some examples, other methods of spectral estimation can be used, such as Bartlett Beamformer or Minimum Variance Distortionless Response (MVDR) Beamformer. Doppler data indicates a velocity of the object reflecting the FMCW signal relative to the FMCW receiver 410. In some examples, such as examples in which one or more component transmitters of the FMCW transmitter 306 are located along a straight line (e.g., in one dimension), angle data includes one angle dimension (such as azimuth or elevation). In some examples, angle data includes two angle dimensions.

The range data, Doppler data, and angle data compose a radar cube 126. In some examples, the radar cube 126 has three or four dimensions. In the radar cube 126, returned signals are described in a range dimension determined by the range data, a velocity (or Doppler) dimension (velocity is determined by the Doppler data), and one or two angle dimensions determined by the angle data. Step 110 is further described with respect to FIGS. 5 and 6.

In step 112, a detection process uses the radar cube 126 to determine point locations in space, with associated velocity vectors, corresponding to the objects in range that reflected the signals to form a point cloud 128. In step 114, a clustering and tracking process (jointly referred to herein as a tracking process) draws bounding boxes around portions of the point cloud 128 corresponding to different objects (clustering), determines a centroid of the bounded object, and predicts a motion vector of the bounded object (tracking). The centroid is a weighted mean of the point cloud 128 corresponding to the tracked object—in other words, a single spatial position corresponding to the tracked object. The motion vector corresponds to a velocity of the centroid of the tracked object. A bounding box, centroid, and centroid velocity (also referred to as a track velocity) together comprise track information 130 for a corresponding tracked object. The tracking process is configured to simultaneously track multiple objects using the radar cube 126 and the point cloud 128. Steps 112 and 114 are further described with respect to FIG. 7.

In step 116, the processing circuit generates, respectively for different ones of the tracked objects, a micro-Doppler (μ-Doppler) spectrogram and a micro-range (μ-range) spectrogram describing movement and other characteristics of the respective tracked object. Herein, spectrogram generation 116 uses the radar cube 126 and the track information 130. In some examples, a μ-Doppler spectrogram expresses information regarding target movement, rotation, or vibration in addition to main body motion (gross motion of the object). In some examples, use of both μ-Doppler spectrograms and μ-range spectrograms provides additional information to the object classifier that improves classifier accuracy.

For example, μ-Doppler spectrograms can be similar for some types of motion of some object classes, such as walking humans and walking pets, or fans with spinning blades and radio controlled drones with spinning blades. Accordingly, μ-range spectrograms can be used to enable extraction of additional distinguishing features, such as object sizes. In some examples, a μ-range spectrogram expresses information regarding object sizes in the range domain, and how this object-specific spatial information is distributed across the range spectrum. For example, reflections across the range domain of a walking human body, such as reflections from different body parts such as arms and legs, may help to distinguish a walking human from a tree.

In some examples, spectrogram generation is performed for each tracked object in each iteration of step 116. Use of a multiple object tracking process enables generation of a distinct μ-Doppler spectrogram and μ-range spectrogram for different, corresponding ones of the tracked objects. In some examples, such as examples with limited processing and/or memory resources in FOVs with multiple (for example, a large number) of objects in range 422, spectrogram generation is performed on an alternating or rotating (or otherwise changing) basis with respect to different objects tracked in step 114. Generation of μ-Doppler spectrograms and μ-range spectrograms is further described with respect to FIGS. 8 through 11B.

In step 118, features are extracted from the μ-Doppler spectrograms and μ-range spectrograms to generate one dimensional (1-D) feature vectors. Feature extraction from μ-Doppler spectrograms is further described with respect to FIGS. 8, 9A, and 9B. Feature extraction from μ-range spectrograms is further described with respect to FIGS. 10, 11A, and 11B. In step 120, the 1-D feature vectors are used to train a 1-D convolutional neural network (CNN) classifier (or other trainable network, such as a recurrent neural network (RNN)), or are applied to a trained 1-D CNN to classify a corresponding tracked object or multiple tracked objects. An example 1-D CNN classifier is further described with respect to FIG. 12.

In step 120 the classifier can be used to determine, for example, whether an object in range 422 is a human 122 or a non-human 124. The classifier can also be used to distinguish a different and/or larger set of classes, depending on the labeled training data used to train the classifier and the output structure of the classifier. In some examples, such as examples with limited processing and/or memory resources in FOVs with multiple (for example, a large number) of objects in range 422, classification is performed on an alternating, rotating, prioritized, or otherwise changing basis with respect to different objects tracked in step 114. In some examples, prioritization is performed in response to characteristics of the point cloud 128 or of the track information 130.

In some examples, a 1-D classifier is much simpler than a 2-D classifier; in some examples, one or more orders of magnitude simpler. Accordingly, in some examples, a 1-D CNN (or other) classifier can be run in real time using lower cost and/or lower power processing circuits than a 2-D CNN (or other) classifier. In some examples, a 1-D CNN classifier can be run using edge processing. In some examples, a 1-D CNN classifier can be run with a delay of a few milliseconds to a few tens of milliseconds from FMCW chirp to object classification using low cost, low power hardware. In some examples, use of both μ-Doppler spectrograms and μ-range spectrograms with a 1-D CNN classifier compensates for a decrease in information content from 2-D (spectrograms) to 1-D (extracted features) to enable high accuracy classification of tracked objects. In some examples, μ-Doppler spectrograms and μ-range spectrograms can be used with a 2-D CNN (or other) classifier.

Figure 2A:
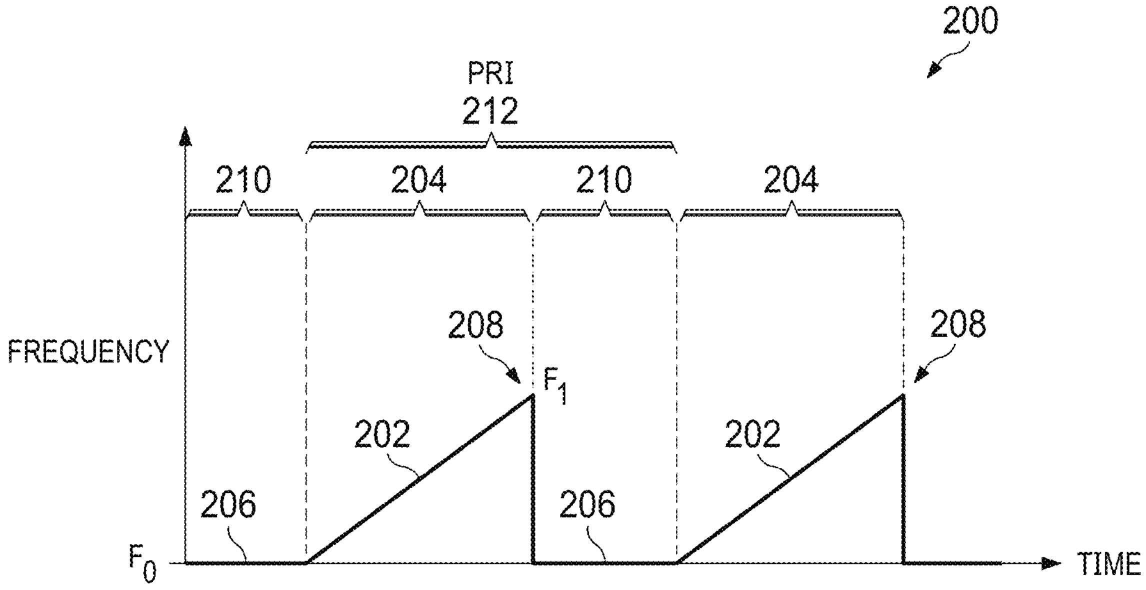
FIG. 2A is a graph of an example FMCW signal to be transmitted by an FMCW radar system.

FIG. 2A is a graph of an example FMCW signal 200 to be transmitted by an FMCW radar system, such as an automotive, industrial, or IoT FMCW radar system. The vertical axis corresponds to frequency, and the horizontal axis corresponds to time. The FMCW signal 200 is modulated to define FMCW chirps 202. The duration of an FMCW chirp 202 is referred to herein as the ramp time 204. During an FMCW chirp 202, the transmitter frequency may ramp upwards like a sawtooth wave, from a base frequency $F_0$ 206 to a maximum frequency $F_1$ 208. An FMCW chirp 202 has a slope $S=(F_1-F_0)$/ramp time. The slope of the FMCW signal 200 corresponds to a change in frequency per unit of time, for example, ΔHz/s. Between FMCW chirps 202 are idle times 210. An idle time 210 is a period during which the FMCW signal 200 is not being transmitted, and which may be a time period in which the transmitter(s) are turned off or in a low power state.

The time from the beginning of one FMCW chirp 202 to the beginning of the next FMCW chirp 202 of the same transmitter is referred to as the pulse repetition interval (PRI) 212 of the FMCW signal 200, and equals the ramp time 204 plus the idle time 210 of the transmitter. Equivalently, the PRI 212 equals the number of transmitters in an FMCW radar system, multiplied by the total of the ramp time 204 for one FMCW chirp 202 plus the time from the end of the FMCW chirp 202 to the beginning of the sequentially next FMCW chirp 202 by another transmitter of the FMCW radar system (the ramp time 204 plus an inter-chirp time). In some examples, the duration of a PRI 212 defines a maximum discernable Doppler range. The inverse of the PRI 212 is the pulse repetition frequency (PRF) of the FMCW signal 200.

Fast time refers to the different time slots composing a PRI 212 during a single FMCW chirp 202, and is dependent on the rate at which a received signal is sampled. Slow time updates after each PRI 212, and refers to time over the course of multiple FMCW chirps 202.

Figure 2B:
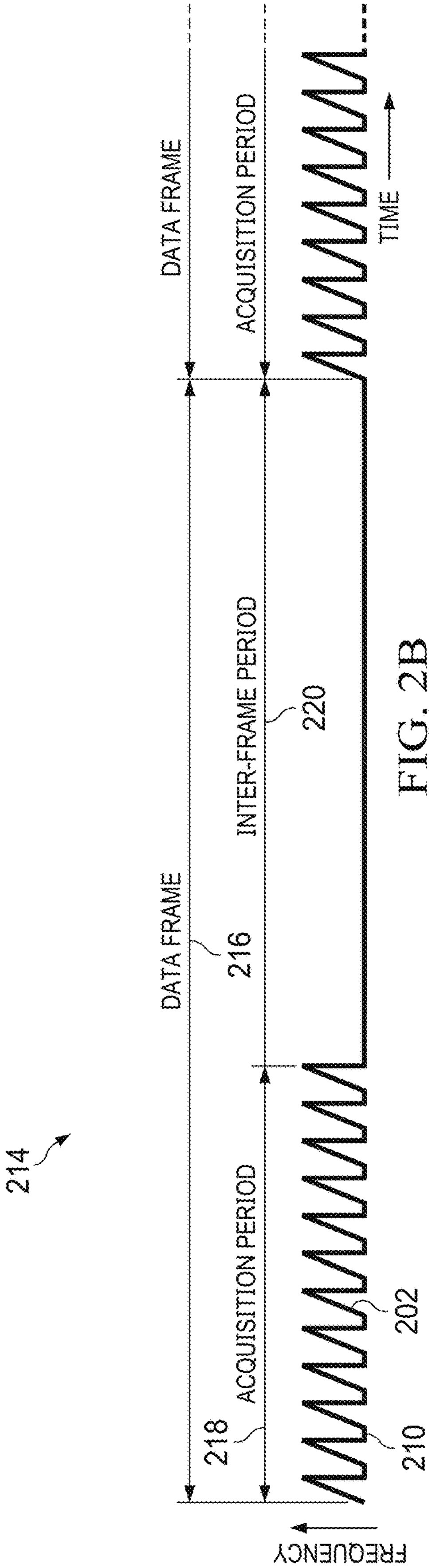
FIG. 2B is a graph of an example data frame of FMCW signals to be transmitted by an FMCW radar system.

FIG. 2B is a graph 214 of an example data frame 216 of FMCW signals 200 to be transmitted by an FMCW radar system. A data frame 216 includes an acquisition period 218 and an inter-frame period 220. The acquisition period includes a series of FMCW chirps 202 from the various transmitters 306. During the inter-frame period 220 the transmitters 306 transmit no signal. In some examples, the inter-frame period 220 is used to conserve power, or to provide time to complete analysis of received reflected signals corresponding to the FMCW chirps 202 transmitted during the acquisition period 218.

FIG. 3A is a diagram of an example Doppler division multiple access (DDMA) FMCW transmission 300. DDMA is used herein as an example transceiver protocol; other transceiver protocols, such as time division multiple access (TDMA), can also be used with methods and systems described herein. An FMCW synthesizer 302 (e.g., an FMCW signal generator) generates an FMCW signal 200. The FMCW synthesizer 302 outputs the FMCW signal 200 to a first phase shifter (phase shifter 1) 304*a*, a second phase shifter (phase shifter 2) 304*b*, and a third phase shifter (phase shifter 3) 304*c*. The first phase shifter 304*a* outputs a phase shifted FMCW signal 200 to a first transmitter 306*a*. The second phase shifter 304*b* outputs a phase shifted FMCW signal 200 to a second transmitter 306*b*. The third phase shifter 304*c* outputs a phase shifted FMCW signal 200 to a third transmitter 306*c*.

Example FMCW chirps 202 are shown corresponding to each of the first transmitter 306*a*, the second transmitter 306*b*, and the third transmitter 306*c*. The FMCW synthesizer 302 and the first phase shifter 304*a* together generate a first set of chirps 308*a*. The FMCW synthesizer 302 and the second phase shifter 304*b* together generate a second set of chirps 308*b*. The FMCW synthesizer 302 and the third phase shifter 304*c* together generate a third set of chirps 308*c*.

To perform DDMA FMCW transmission, an FMCW signal, such as the FMCW signal 200 of FIG. 2, is phase shifted using phase shift coding that is differentiated in slow time (e.g., between sets of chirps) for different transmitters. In an example, a phase shift coding has sixty-four possible code settings, from zero to sixty-three. Individual code increments represent π/64 radians, so that phase shift ranges from zero radians to $2\pi*{}^{63}\!/_{64}{}^{ths}$ radians. Example phase shift code vectors include [0 16 32 48 0 16 32 48 0] and [0 24 48 8 32 56 16 40 0]. The first phase shift code vector increments by 16, and the second coding vector increments by 24. A phase shift increment corresponding to the code increment of a phase shift code vector is referred to herein as a base phase shift. After eight FMCW chirps 202, the two phase shift code vectors return to the same zero value phase offset, so that they periodically have the same value in fast time. However, the two vectors are differentiated over slow time.

In an example, base phase shift of the first, second, and third phase shifters 306*a*, 306*b*, and 306*c* are, respectively, $\phi 1=0$, $\phi 2=\upsilon$, and $\phi 3=2\upsilon$, where $\upsilon$ is a phase shift corresponding to an integer code value. The transmitters 306*a*, 306*b*, and 306*c* transmit FMCW chirps that have been phase shifted using sequentially increasing multiples of respective base phase shifts. These increasing phase shifts cycle through respective phase shift code vectors.

A DDMA FMCW radar system can be used to implement a multiple-input multiple-output (MIMO) radar system. In a MIMO radar system with a number N transmitters and a number M receivers, the N signals transmitted by the transmitters are predictable and different across different transmitters. For example, in DDMA, transmitted signals are differentiated by applying unique Doppler shift sequences per transmitter to respective sets of FMCW chirps 102 to be transmitted. In another example, in TDMA, transmitted signals are differentiated by causing each transmitter to transmit signals within time slots that are unique with respect to the other transmitters.

A MIMO radar system as described, using signals differentiated across transmitters, enables N different signals to be extracted from each of the signals received by the M receivers, resulting in N×M different received signals, as if the MIMO radar system had N×M different receivers. This enables improved spatial resolution of the radar system. In DDMA, Doppler differentiation can be used to make the N transmitted signals predictable and unique using phase shift vectors that are differentiated from each other in slow time. In TDMA, since the transmitted signals are in different time slots, they are differentiated from each other in slow time. Because of the property of being able to extract N×M different received signals, a MIMO radar system as described is referred to as having an N×M element virtual antenna array.

FIG. 3B is a graph of example Doppler shifts of received reflected FMCW chirps 310 corresponding to the DDMA FMCW transmission 300 of FIG. 3A. A horizontal axis corresponds to Doppler shift frequency and a vertical axis corresponds to amplitude. Doppler shift refers to a change in frequency of a signal received by an FMCW radar system (such as the FMCW radar system 400 of FIG. 4) with respect to a corresponding FMCW chirp 202 transmitted by the FMCW radar system. Doppler shifts are caused by relative motion of the FMCW radar system with respect to an object off which the received signal was reflected. FMCW chirps 202 that are transmitted at the same time as phase shifted copies of each other—same base frequency $F_0$ 206, same ramp time 204, and same maximum frequency $F_1$ 208—result in different Doppler shifts. In some examples, if the base phase shift is zero, then the Doppler frequency in a received reflected signal is dependent only on the velocity of the reflecting object. DDMA phase shifting results in Doppler frequencies that are unique per transmitter and that add to the inherent Doppler frequency shift that is dependent solely on velocity.

A Doppler shift of a first received signal (signal Tx1*a*) 312*a* corresponds to an FMCW chirp 202 of the first set of chirps 308*a*, transmitted by the first transmitter 306*a*. A Doppler shift of a second received signal (signal Tx2*a*) 314*a* corresponds to an FMCW chirp 202 of the second set of chirps 308*b*, transmitted by the second transmitter 306*b*. A Doppler shift of a third received signal (signal Tx3*a*) 316*a* corresponds to the third set of chirps 308*c*, transmitted by the third transmitter 306*c*. Signal Tx1*a* 312*a*, signal Tx2*a* 314*a*, and signal Tx3*a* 316*a* are shown grouped together, separated in frequency by relatively small increments corresponding to the separations in phase of the first set of chirps 308*a*, the second set of chirps 308*b*, and the third set of chirps 308*c*. Accordingly, signal Tx1*a* 312*a*, signal Tx2*a* 314*a*, and signal Tx3*a* 316*a* correspond to a first detected object.

Similarly, a Doppler shift of a fourth received signal (signal Tx1*b*) 312*b* corresponds to an FMCW chirp 202 of the first set of chirps 308*a*, transmitted by the first transmitter 306*a*. A Doppler shift of a fifth received signal (signal Tx2*b*) 314*b* corresponds to an FMCW chirp 202 of the second set of chirps 308*b*, transmitted by the second transmitter 306*b*. A Doppler shift of a sixth received signal (signal Tx3*b*) 316*b* corresponds to the third set of chirps 308*c*, transmitted by the third transmitter 306*c*. Signal Tx1*b* 312*b*, signal Tx2*b* 314*b*, and signal Tx3*b* 316*b* are shown grouped together, separated in frequency by relatively small increments corresponding to the separations in phase of the first set of chirps 308*a*, the second set of chirps 308*b*, and the third set of chirps 308*c*. Accordingly, signal Tx1*b* 312*b*, signal Tx2*b* 314*b*, and signal Tx3*b* 316*b* correspond to a second detected object.

FIG. 4 is a functional block diagram of an example FMCW radar system 400 for transmitting a DDMA FMCW transmission 300 as shown in FIG. 3A, and receiving reflected FMCW chirps 310 as shown in FIG. 3B. In some examples, a DDMA FMCW radar system, or an FMCW radar system using another type of transceiver protocol, uses different functional blocks. In some examples, the FMCW radar system 400 is configured to use millimeter wave sensing or sub-terahertz (sub-THz) sensing. In some examples, an FMCW radar system 400 that uses millimeter wave sensing transmits FMCW chirps 202 in a 60 gigahertz or 77 gigahertz band. In some examples, an FMCW radar system 400 that uses sub-THz sensing transmits FMCW chirps 202 in a 140 gigahertz (GHz) or higher band.

The FMCW radar system 400 includes an FMCW synthesizer 302, a processor 402, a transmitter side 404, a receiver side 406, and a memory 420. In some examples, the processor 402 is a central processing unit (CPU), a digital signal processor (DSP), or another type of processing circuit. The processor 402 includes a hardware accelerator 407. The transmitter side 404 of the FMCW radar system 400 includes a first phase shifter (phase shifter 1) 304*a*, a second phase shifter (phase shifter 2) 304*b*, and a third phase shifter (phase shifter 3) 304*c*; a first power amplifier (PA1) 408*a*, a second power amplifier (PA2) 408*b*, and a third power amplifier (PA3) 408*c*; and a first transmitter (TX1) 306*a*, a second transmitter (TX2) 306*b*, and a third transmitter (TX3) 306*c*. In some examples, determinations described herein as being performed by the hardware accelerator 407 are performed using a processor 402 without a hardware accelerator 407.

The receiver side 406 of the FMCW radar system 400 includes a first receiver (RX1) 410*a*, a second receiver (RX2) 410*b*, a third receiver (RX3) 410*c*, and a fourth receiver (RX4) 410*d*; a first low noise amplifier (LNA1) 412*a*, a second low noise amplifier (LNA2) 412*b*, a third low noise amplifier (LNA3) 412*c*, and a fourth low noise amplifier (LNA4) 412*d*; a first mixer 414*a*, a second mixer 414*b*, a third mixer 414*c*, and a fourth mixer 414*d*; a first band pass filter (BPF) and variable gain amplifier (VGA) circuit (BPF/VGA 1) 416*a*, a second BPF and VGA circuit (BPF/VGA 2) 416*b*, a third BPF and VGA circuit (BPF/VGA 3) 416*c*, and a fourth BPF and VGA circuit (BPF/VGA 4) 416*d*; a first ADC circuit (ADC 1) 418*a*, a second ADC circuit (ADC 2) 418*b*, a third ADC circuit (ADC 3) 418*c*, and a fourth ADC circuit (ADC 4) 418*d*.

The FMCW synthesizer 302 generates FMCW chirps 202 to be transmitted, such as for object detection and range, angle, and velocity determination. The FMCW synthesizer 302 outputs the FMCW chirps 202 to respective first inputs of the first, second, and third phase shifters 304*a*, 304*b*, and 304*c*, and also to respective first inputs of the first, second, third, and fourth mixers 414*a*, 414*b*, 414*c*, and 414*d*. The first, second, and third phase shifters 304*a*, 304*b*, and 304*c* phase shift the FMCW chirps 202 using respective phase shift code vectors, as described with respect to FIG. 3A.

The first, second, and third phase shifters 304*a*, 304*b*, and 304*c* output the FMCW chirps 202 to, respectively, the first, second, and third power amplifiers PA1 408*a*, PA2 408*b*, and PA3 408*c*. The first, second, and third power amplifiers PA1 408*a*, PA2 408*b*, and PA3 408*c* amplify the respective phase shifted FMCW chirp signals, and output the amplified signals to, respectively, the first, second, and third transmitters 306*a*, 306*b*, and 306*c*. The first, second, and third transmitters 306*a*, 306*b*, and 306*c* transmit the amplified, phase shifted FMCW chirps. In some examples, the transmitted signals are reflected by an object 422 that is within the detection and range, angle, and velocity determination range of the FMCW radar system 400 (object in range 422).

The reflected signals are received by the first, second, third, and fourth receivers 410*a*, 410*b*, 410*c*, and 410*d*. The first, second, third, and fourth receivers 410*a*, 410*b*, 410*c*, and 410*d* output the received signals to, respectively, the first, second, third, and fourth low noise amplifiers LNA1 412*a*, LNA2 412*b*, LNA3 412*c*, and LNA4 412*d*, which amplify the received signals. The first, second, third, and fourth low noise amplifiers LNA1 412*a*, LNA1 412*b*, LNA1 412*c*, and LNA4 412*d* output the amplified signals to second inputs of, respectively, the first, second, third, and fourth mixers 414*a*, 414*b*, 414*c*, and 414*d*. The first, second, third, and fourth mixers 414*a*, 414*b*, 414*c*, and 414*d* output the mixed signals to, respectively, the first, second, third, and fourth BPF/VGA circuits 416*a*, 416*b*, 416*c*, and 416*d*, which filter and amplify the mixed signals. The first, second, third, and fourth BPF/VGA circuits 416*a*, 416*b*, 416*c*, and 416*d* output the resulting cleaned signals to, respectively, the first, second, third, and fourth ADC circuits 418*a*, 418*b*, 418*c*, and 418*d*, which sample the cleaned mixed signals to generate respective data sets made up of digital samples. The first, second, third, and fourth ADC circuits 418*a*, 418*b*, 418*c*, and 418*d* output the digital samples to the processor 402 for analysis.

The processor 402 and/or the memory 420 provide an example of hardware adapted to execute programming to accomplish various described steps. The processor 402 uses the digital samples to determine presence, range, angle, and velocity of the object in range 422. For example, presence of an object may be determined based on a signal amplitude greater than a threshold. Range may be determined by a unique range frequency corresponding to the signal's round trip delay multiplied by the FMCW chirp 202 slope. Velocity may be determined by the phase variation of the unique range frequency over multiple chirps, which manifests as a unique Doppler frequency. Angle may be determined by the phase variation for a particular received chirp across different receivers, caused by the difference in time of flight across the different receivers. These determinations are further discussed with respect to FIGS. 5 and 6.

In some examples, the FMCW synthesizer 302, phase shifters 304, and PAs 408 are used to perform the step 102 FMCW signal generation, and the transmitters 306 are used to perform the step 104 FMCW signal transmission. The receivers 410 are used to perform the step 106 FMCW signal reception, and the LNAs 412, mixers 414, BPF/VGA circuits 416, and ADCs 418 are used to perform the step 108 signal pre-processing and ADC to generate digitized data.

In some examples, an IC to perform steps 102 through 120 includes the FMCW radar system 400 of FIG. 4. In some implementations, the IC excludes the antennas corresponding to the transmitters 306 and receivers 410; that is, the antennas are externally located and configured to couple to the IC. In some examples, such an IC includes the FMCW radar system 400 (with antennas). In some examples, an IC includes a different portion of the FMCW radar system 400, such as the processor 402 (which may correspond to one or more cores) and the memory 420. In some examples, different ICs perform different portions of steps 102 through 120. For example, an IC can include a processor 402 and/or memory 420 configured to perform steps 110 through 120, or configured to perform steps 116 through 120.

Figure 5:
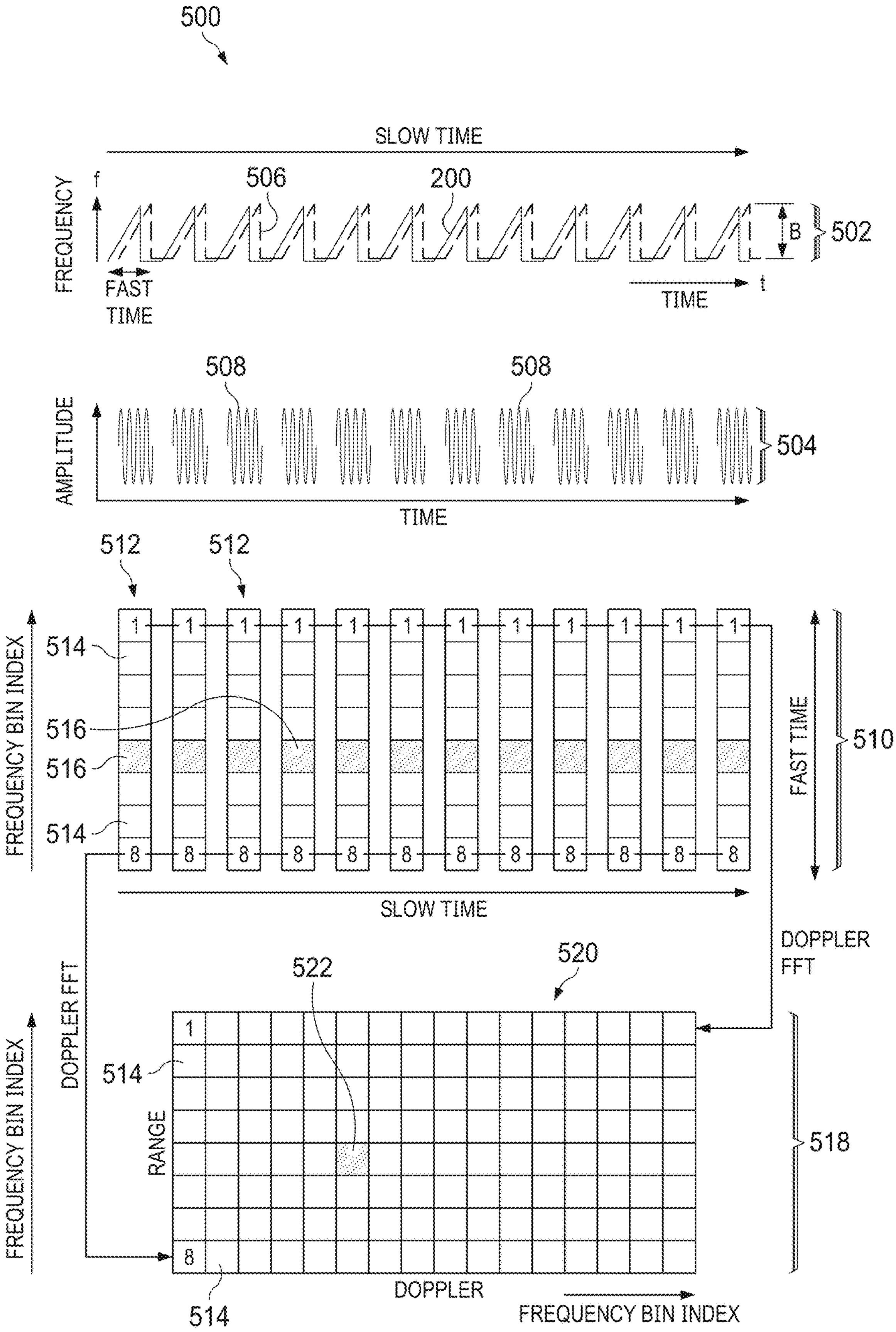
FIG. 5 illustrates an example process for determining range and velocity using FMCW chirps transmitted and received by the FMCW radar system of FIG. 4.

FIG. 5 illustrates a process 500 for determining range and velocity using FMCW chirps 202 transmitted and received by the FMCW radar system 400 of FIG. 4. For step 502, the horizontal axis indicates time, and the vertical axis indicates frequency. For step 504, the horizontal axis indicates time, and the vertical axis indicates amplitude. The IF signal is the product of mixing the received signal with the transmitted signal. In step 502, an FMCW signal 200 is transmitted, and a received FMCW signal 506 is received. Individual FMCW chirps 202 are transmitted and received in fast time. The FMCW signal 200 is transmitted, and the received FMCW signal 506 is received, in slow time.

The amount of time for a transmitted signal to reach the object in range 422 equals d. The time for the reflected signal to return from the object in range 422 and be received by the first, second, third, and fourth receivers 410*a*, 410*b*, 410*c*, and 410*d* also equals d. Accordingly, the time of flight of an FMCW chirp 202 reflected by the object in range 422 is 2d. In some examples, the value of d varies in response to the distinct locations of different ones of the transmitters 306 and/or the distinct locations of the receivers 410. This varying value of d manifests in the signals received by the different receivers 410 as a phase variation that is used to perform angle estimation. Further, as discussed with respect to FIG. 3B, received FMCW chirps 202 are Doppler shifted relative to corresponding transmitted FMCW chirps 202 depending on motion of the FMCW radar system 400 relative to the object in range 422 from which the received FMCW chirps 202 are reflected, and depending on phase shift applied by a corresponding one of the first, second, or third phase shifter 304*a*, 304*b*, or 304*c*.

In step 504, the first, second, third, and fourth mixers 414*a*, 414*b*, 414*c*, and 414*d* mix (for example, multiply) respective received signals with the FMCW signal 200 generated by the FMCW synthesizer 302 to produce intermediate frequency (IF) signals 508. The frequency of the IF signal is linearly proportional to the time of flight, 2d, of the corresponding FMCW chirp 202. As described with respect to FIG. 4, the first, second, third, and fourth ADCs 418*a*, 418*b*, 418*c*, and 418*d* sample these IF signals after they are cleaned and amplified, and provide the resulting digital samples to the processor 402 for analysis.

In step 510, the hardware accelerator 407 of the processor 402 performs an FFT on sets of the digital samples in fast time. This means that FFTs are determined for sets of samples of IF signals (received signals mixed with transmitted signals), so that the sets of samples are aligned in fast time and in slow time to create a 2-D matrix, and then a 2-D FFT is applied to the 2-D matrix. This produces a series of 1-D range FFTs 512 that are sequential in time, and that correspond to a duration of one data frame 216.

The range FFTs 512 are divided into frequency bins 514. Each frequency bin 514 covers a separate Doppler shift frequency range and has an index indicating a range to the object and a value indicating a return signal strength associated with the respective range. The number of frequency bins 514 in respective range FFTs 512 corresponds to a frequency resolution of the FMCW radar system 400. Frequency resolution of the FMCW radar system 400 corresponds to range and velocity resolution of the FMCW radar system 400.

In the illustrated example, there are eight frequency bins 514 in each range FFT 512. In some examples, a range FFT 512 includes hundreds of frequency bins. If an object in range 422 is present to reflect the transmitted FMCW chirps 202, over a period of time there will be an amplitude spike 516. The amplitude spike 516 is shown in FIG. 5 as a shaded box in frequency bins 514 of the range FFTs 512. The amplitude spike 516 corresponds to the distance of the object in range 422 from the receiver (the first, second, third, or fourth receiver 410*a*, 410*b*, 410*c*, or 410*d*) that received the FMCW signal 100 being analyzed. The range FFTs 512 with this amplitude spike 516 correspond to the intermediate frequency indicating the presence of the object in range 422.

In step 518, the hardware accelerator 407 of the processor 402 performs an FFT on the 1-D range FFTs, in slow time. Accordingly, the processor 402 performs an FFT on a temporally sequential set of the 1-D range FFTs 512 to produce a 2-D range-Doppler FFT 520 (referred to herein as a Doppler FFT 520).

The Doppler FFT 520 includes a set of bins that each has (1) an index that represents a combination of range and velocity, and (2) a value indicating a return signal strength associated with the respective range and velocity. The Doppler FFT 520 covers a number of PRIs 212 determined in response to a designed velocity resolution; in some examples, this corresponds to one data frame 216. A vertical dimension of the Doppler FFT 520, corresponding to fast time (an individual PRI 212 with respect to a corresponding one of the transmitters 306), is divided into frequency bins 514 indicating range. The vertical dimension of the Doppler FFT 520 is also referred to as the range domain of the Doppler FFT 520. A horizontal dimension of the Doppler FFT 520, corresponding to slow time (across the selected number of PRIs 212), is divided into frequency bins 514 indicating Doppler shift. The horizontal dimension of the Doppler FFT 520 is also referred to as the Doppler domain of the Doppler FFT 520. In some examples, the selected number of PRIs 212 covers a few tens of milliseconds.

An amplitude spike 522 (darkened box) in the Doppler FFT 520 indicates the presence of an object in range 422. A vertical coordinate of the particular frequency bin 514 in which the amplitude spike 522 is located indicates the range of the object in range 422 from the FMCW radar system 400. A horizontal coordinate of the particular frequency bin 514 in which the amplitude spike 522 is located provides Doppler shift information. The Doppler shift information represented by the amplitude spike 522 in the Doppler FFT 520 can be used to determine the speed of the object in range 422 relative to the FMCW radar system 400. In an example, the determined speed is an average speed over the selected number of PRIs 212 used to generate the Doppler FFT 520.

Figure 6:
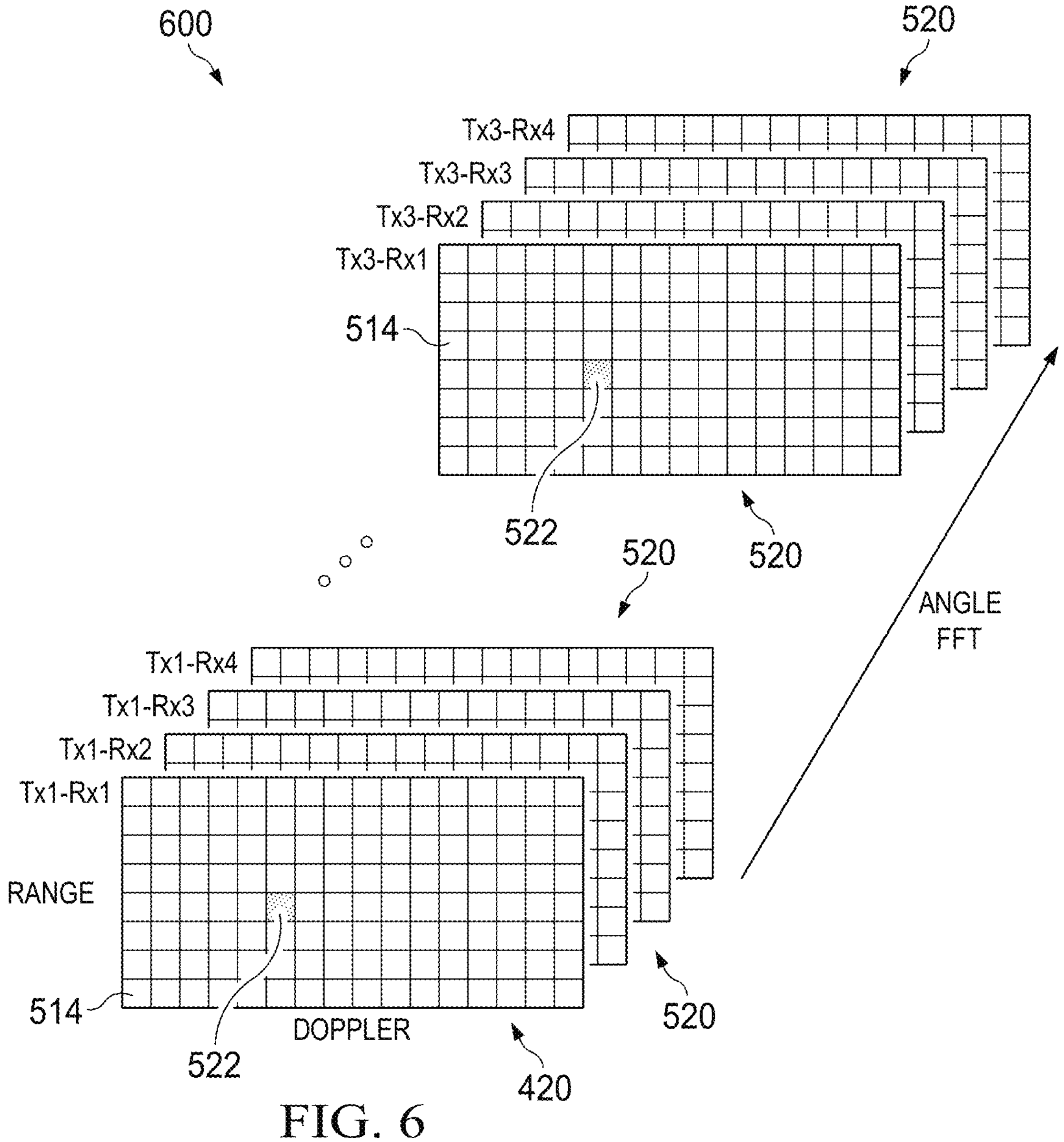
FIG. 6 illustrates an example set of two-dimensional fast Fourier transforms (FFTs) generated by applying the process of FIG. 5 to DDMA FMCW signals received by the first, second, third, and fourth receivers of FIG. 4.

FIG. 6 illustrates a set 600 of Doppler FFTs 520 generated by applying the process 500 of FIG. 5 to DDMA FMCW signals received by the first, second, third, and fourth receivers 410*a*, 410*b*, 410*c*, and 410*d* of FIG. 4. As described above, using differentiated phase shift vectors applied to the first, second, and third phase shifters 304*a*, 304*b*, and 304*c* in slow time enables FMCW signals 200 transmitted by a number N transmitters, and received by a number M receivers, to be treated as N×M separate received signals. For each of the M receivers, an object in range 422 will appear as N different peaks in the 1-D FFTs 512. This increases the spatial resolution of the FMCW radar system 400. The FMCW radar system 400 has three transmitters and four receivers. Accordingly, applying the process 500 to the FMCW radar system 400 results in twelve received signals, which can also be viewed as twelve objects to be resolved.

A disambiguation step, also referred to as transmitter decoding, is performed to distinguish the twelve objects, and then the corresponding 1-D FFTs 512 are processed to generate twelve Doppler FFTs 420. Different ones of the distinguished objects correspond to different combinations of the first, second, or third transmitter 306*a*, 306*b*, or 306*c*, and the first, second, third, or fourth receiver 410*a*, 410*b*, 410*c*, or 410*d*, so that different ones of the Doppler FFTs 520 correspond to different transmitter-receiver combinations. The Doppler FFTs 520 are identified according to the transmitter and the receiver to which they correspond. For example, a Doppler FFT 520 corresponding to the first transmitter (TX1) 306*a* and the third receiver (RX3) 410*c* is identified as TX1-RX3, and a Doppler FFT 520 corresponding to the third transmitter (TX3) 306*c* and the second receiver (RX2) 410*b* is identified as TX3-RX2.

As described above, by using Doppler FFTs 520 corresponding to multiple different receivers, an angle of the object in range 422 with respect to an orientation of the FMCW radar system 400 (angle of arrival) can be determined. For example, two receivers can be used to determine an angle in a single plane, which can be combined with a range to generate a 2-D location of the object in range 422. For example, two receivers can be used to determine range and azimuth of the object in range 422. Similarly, three receivers can be used to determine angles in multiple planes, which can be combined with the range to determine a three dimensional location of the object in range 422. For example, three receivers can be used to determine range, azimuth, and elevation of the object in range 422.

An accuracy with which angle information of the object in range 422 is determined is limited by the number of antennas used to receive the reflected signals. In a MIMO radar system, this limitation corresponds to a number of virtual antennas in the virtual antenna array.

Figure 7A:
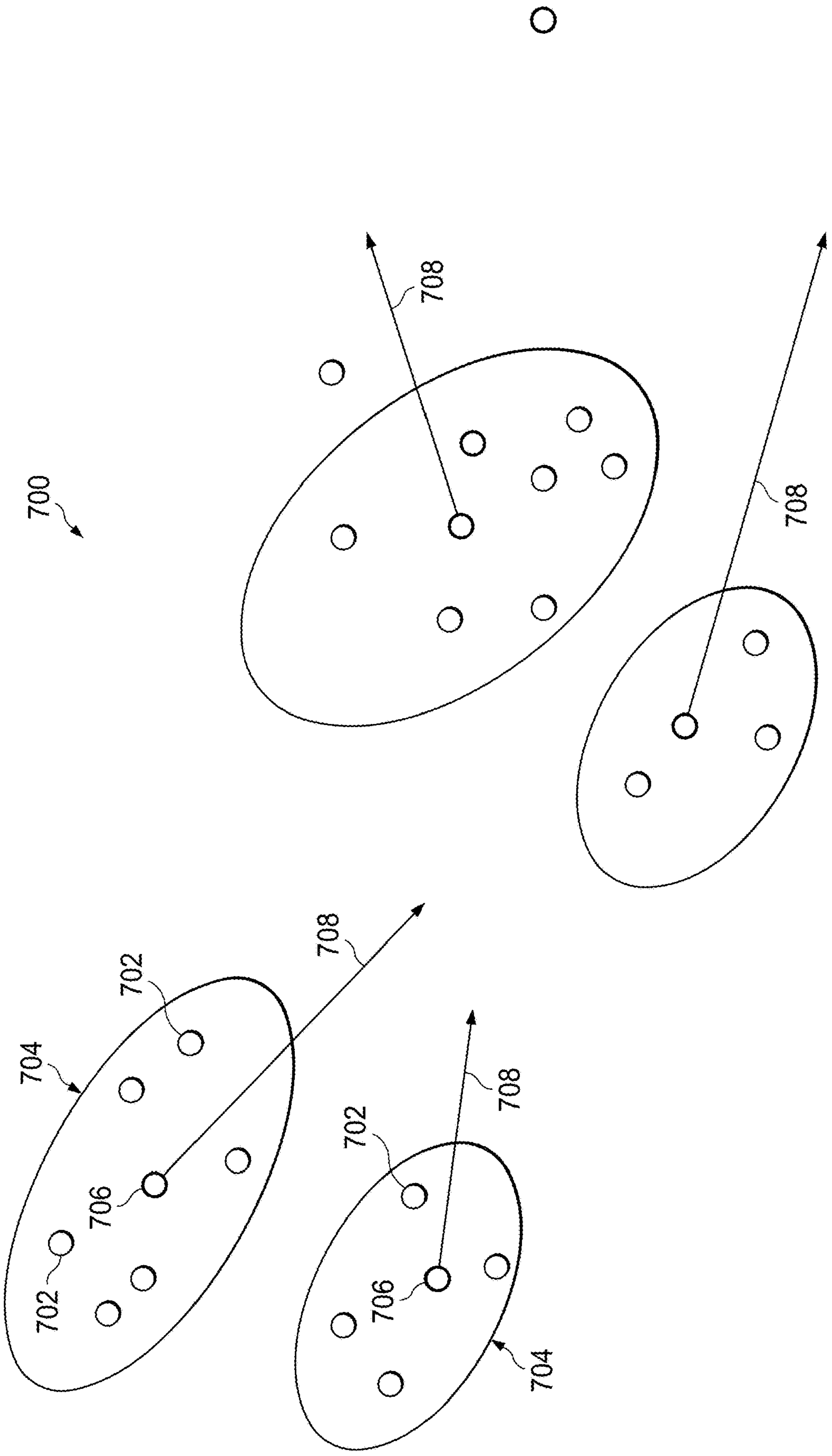
FIG. 7A is a diagram showing an example point cloud with track information.

FIG. 7A is a diagram 700 showing an example point cloud 128 with track information 130 (see FIG. 1). A detector process determines locations of points 702; the detected points 702 together form the point cloud 128. Individual points 702 correspond to amplitude spikes 516 in frequency bins 514, and are located in a range-azimuth or range-elevation plane, or a range-azimuth-elevation cube. In some examples, whether the individual points 702 are located in a plane or a cube is responsive to a 1-D or 2-D topology of the transmitters 306 and receivers 410 of the FMCW radar system 400.

The tracking process groups portions of the point cloud 128 into separate objects, and draws bounding boxes 704 around the different objects. In some examples, bounding boxes 704 have sizes and shapes that are pre-defined, rather than generated by the tracking process. A bounding box 704 can be, for example, a rectangle of two or more dimensions (such as a rectangular box), a circle of two or more dimensions (such as a sphere), or an ellipse of two or more dimensions (such as a three dimensional ellipsoid). In some examples, bounding boxes 704 are defined in range and angle dimensions (one or two angle dimensions). In some examples, bounding boxes 704 are also defined in the Doppler domain. Contrarily, in some examples, Doppler spectrum information across the available Doppler domain is used.

In some examples, such as during training of the object classifier, the bounding box 704 is adjustable by a user. In some examples, a user can adjust a bounding box 704 in response to a video or video frame corresponding to the FOV of the FMCW radar system 400.

The tracking process also determines centroids 706 for respective tracked objects, and predicted motion vectors (track velocities) 708 for the centroids 706. In some examples, the tracking process determines a centroid 706 and track velocity for each tracked object. In some examples, the tracking process uses a tracking algorithm such as an extended Kalman filter to estimate locations and track velocities for centroids 706. In some examples, the tracking process updates centroid 706 location and velocity in response to previous centroid 706 estimations, current measurements such as Doppler spectrum information and/or range spectrum information and/or angle spectrum information, and a motion model such as a Newton motion model.

In some examples, two tracked objects may overlap, corresponding to bounding boxes 704 of the objects overlapping. Handling of object overlap is further described with respect to FIG. 13.

The track information 130 determined as described with respect to FIG. 7A is used to generate μ-Doppler spectrograms 900 and μ-range spectrograms 1100, which are then respectively circularly shifted, as further described in FIGS. 8 through 11B. Circular shifting as described facilitates extraction of features; it enables comparison of apples to apples, including by reducing effects of types of motion that are less germane to object classification. Features extracted as described herein compactly describe power-related properties of circularly shifted μ-Doppler spectrograms 908 and μ-range spectrograms 1108. Extracted features are assembled into 1-D feature vectors to enable use of 1-D classification. This avoids requiring use of 2-D classification networks to classify objects based on 2-D spectrogram information.

Figure 7B:
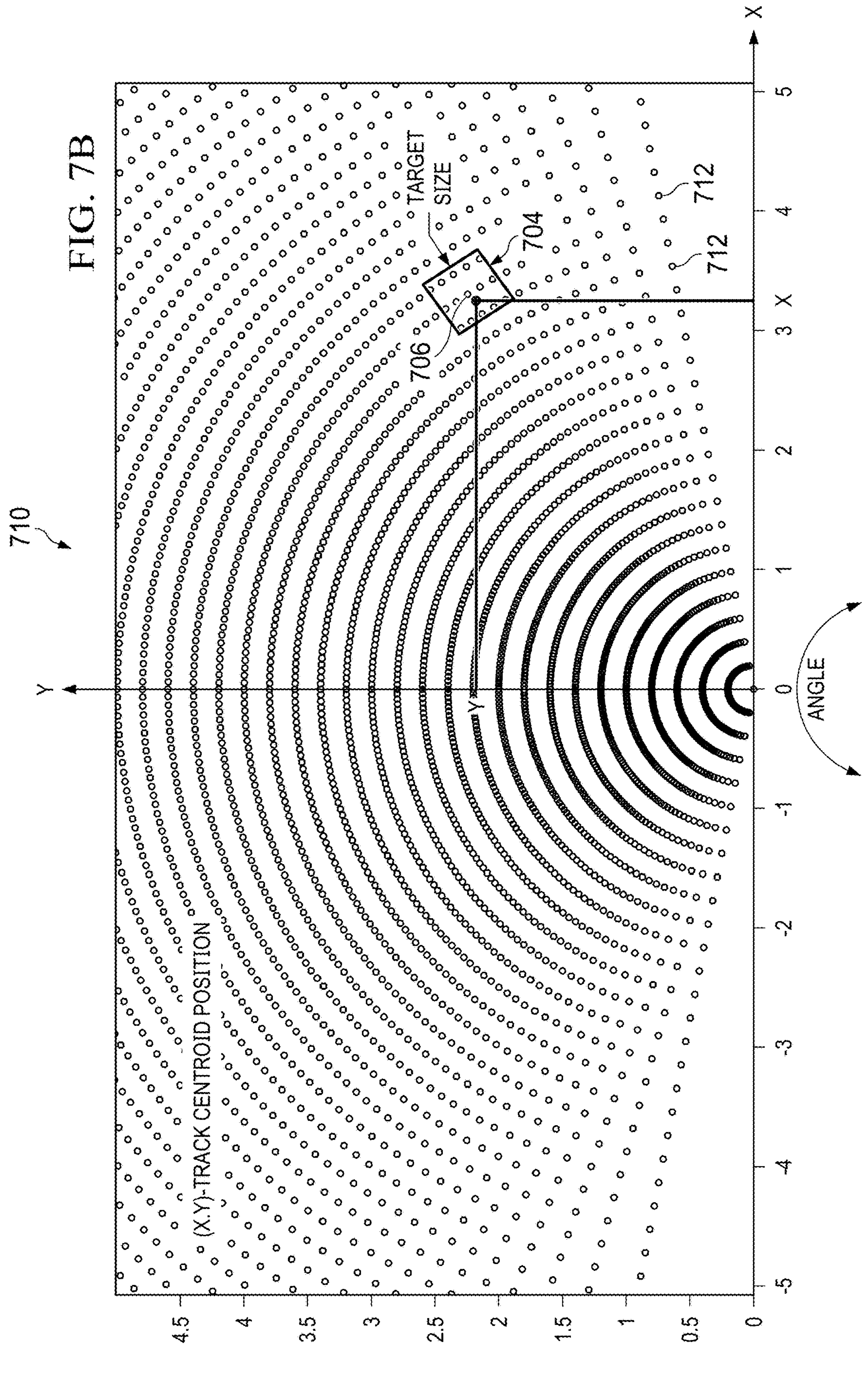
FIG. 7B is a diagram of an example FOV of the FMCW radar system of FIG. 4.

FIG. 7B is a diagram of an example FOV 710 of the FMCW radar system 400 of FIG. 4. The dots 712 in the diagrammed FOV 710 (roughly, conceptually) illustrate correspondence between frequency bins 514 of the radar cube 126 and spatial dimensions within the FOV 710. The frequency bins 514 are indexed in an angle dimension and a range dimension. The spatial locations in the FOV 710 are located by coordinates in an X dimension perpendicular to a central sensing axis of the receivers 410 and within the angle-range plane, and a Y dimension parallel to the central sensing axis of the receivers 410 and within the angle-range plane.

In some examples, centroids 706 determined by the tracking process are located in the X-Y coordinate system. In some examples, the bounding box 704 around a centroid 706 is located in the angle-range coordinate system (frequency bin indices). In some examples, the bounding box 704 corresponding to a centroid 706 corresponds to an angle index size and a range index size that each include a number of bin indices greater than and less than corresponding angle and range bin indices nearest, in the angle-range coordinate system, to the X-Y location of the centroid 706.

Figure 7C:
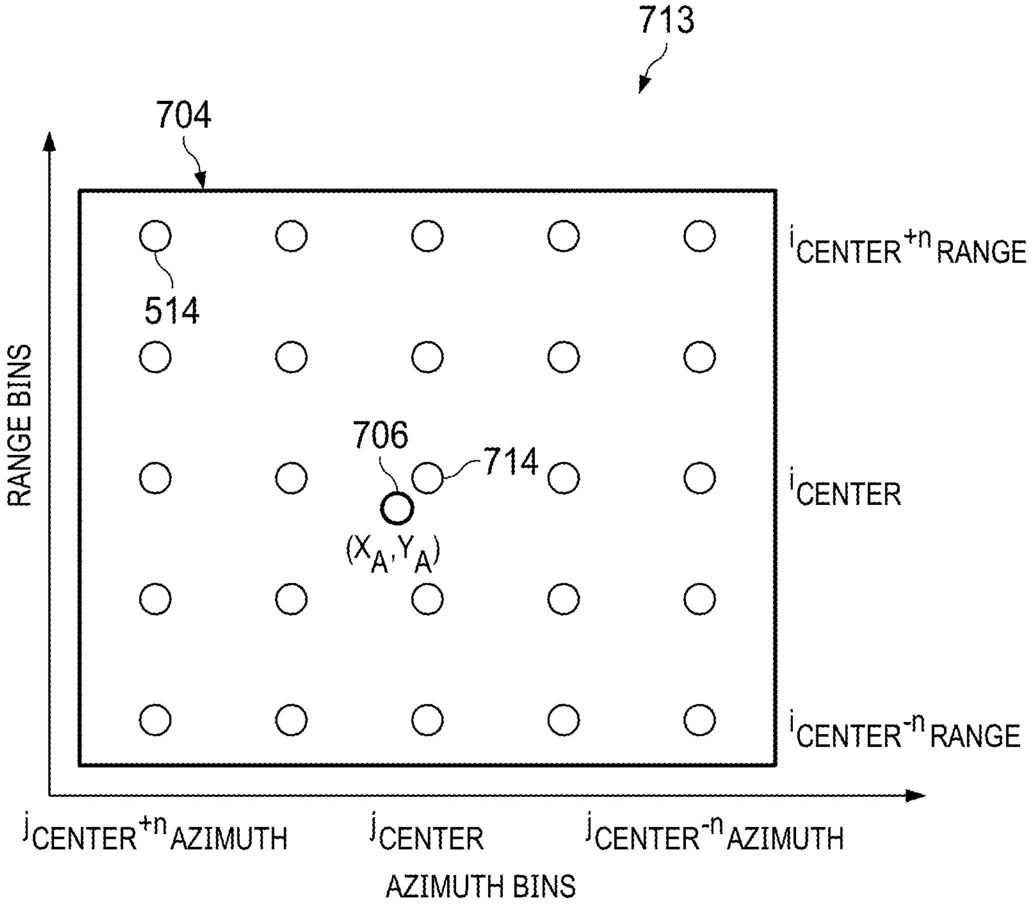
FIG. 7C is a diagram of an example centroid and bounding box corresponding to a tracked object.

FIG. 7C is a diagram 713 of an example centroid 706 and bounding box 704 corresponding to a tracked object. The diagram 713 of FIG. 7C can be considered a zoomed-in view of the bounding box 704 of FIG. 7B, along with its bounded context (such as the centroid 706 and dots 712). As described with respect to FIG. 7B, the centroid 706 has a location ($X_A$, $Y_A$), where $X_A$ is the X coordinate of the centroid 706 and $Y_A$ is the Y coordinate of the centroid 706. The bounding box 706 is defined with respect to an angle-range index of a center frequency bin 714 corresponding to a spatial location nearest the centroid 706. The center frequency bin 714 has an azimuth index $j_{center}$ and a range index $i_{center}$. (In some examples, the bounding box 704 has a different angle dimension, such as elevation; or has two angle dimensions.)

Accordingly, the bounding box 704 is defined by an azimuth frequency bin size and a range frequency bin size. In some examples, the azimuth frequency bin size is ($j_{center}-n_{azimuth}$) to ($j_{center}+n_{azimuth}$), where $2\times n_{azimuth}$ is a length of a first side of the bounding box 704. The range frequency bin size ($j_{center}-n_{range}$) to ($j_{center}+n_{range}$), where $2\times n_{range}$ is a length of a second side of the bounding box 704. In some examples, $n_{range}$ is determined in response to an object size and a range resolution of the FMCW radar system 400. An object size can be, for example, a size of a cluster of points 702 determined by the tracking process to correspond to an object (a cluster of points 702 to be surrounded by a bounding box 704). The range resolution can also be considered a frequency bin 514 to range conversion factor.

Figure 8:
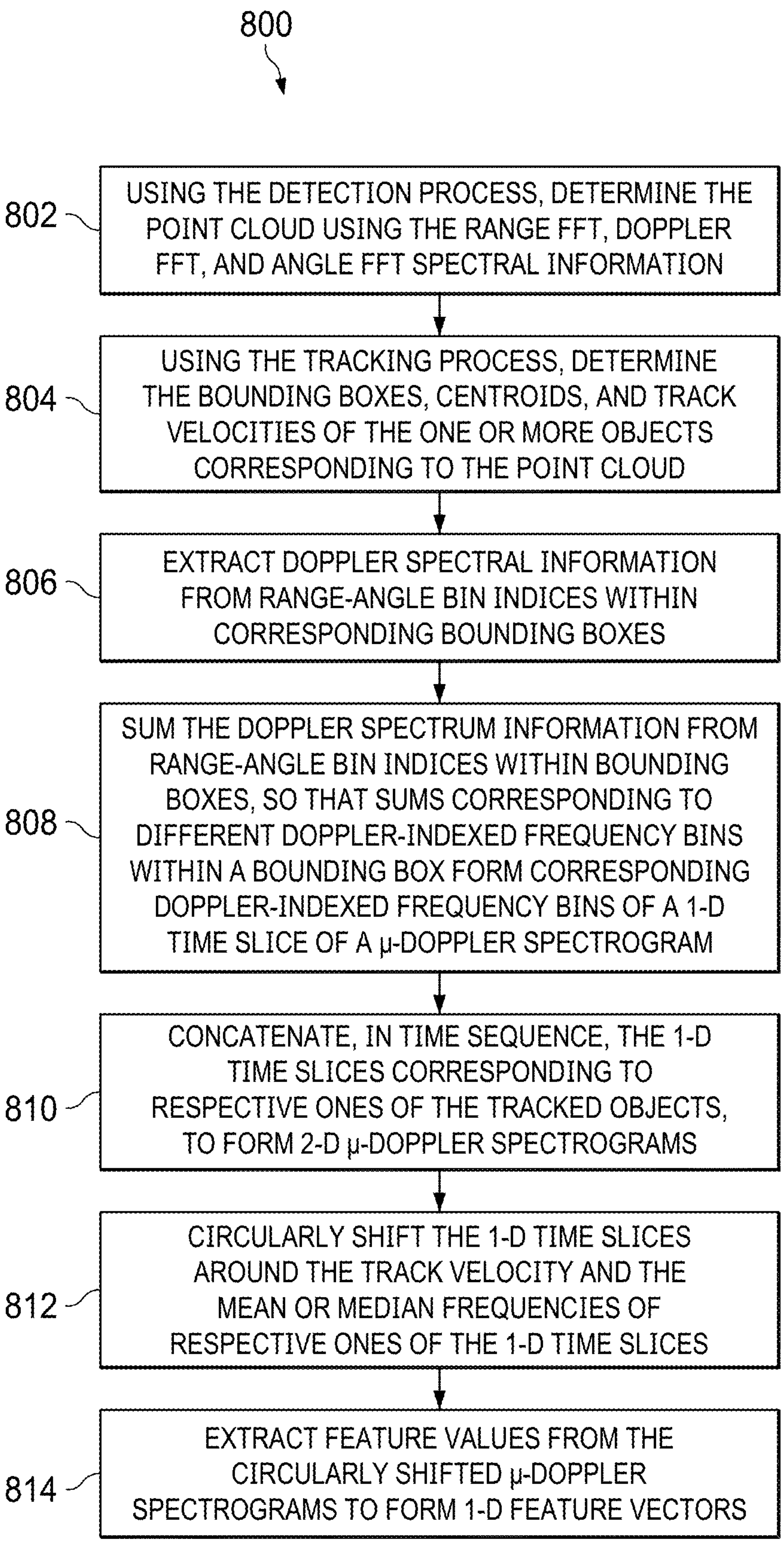
FIG. 8 is an example process for generating a circularly shifted μ-Doppler spectrogram.
Figure 9A:
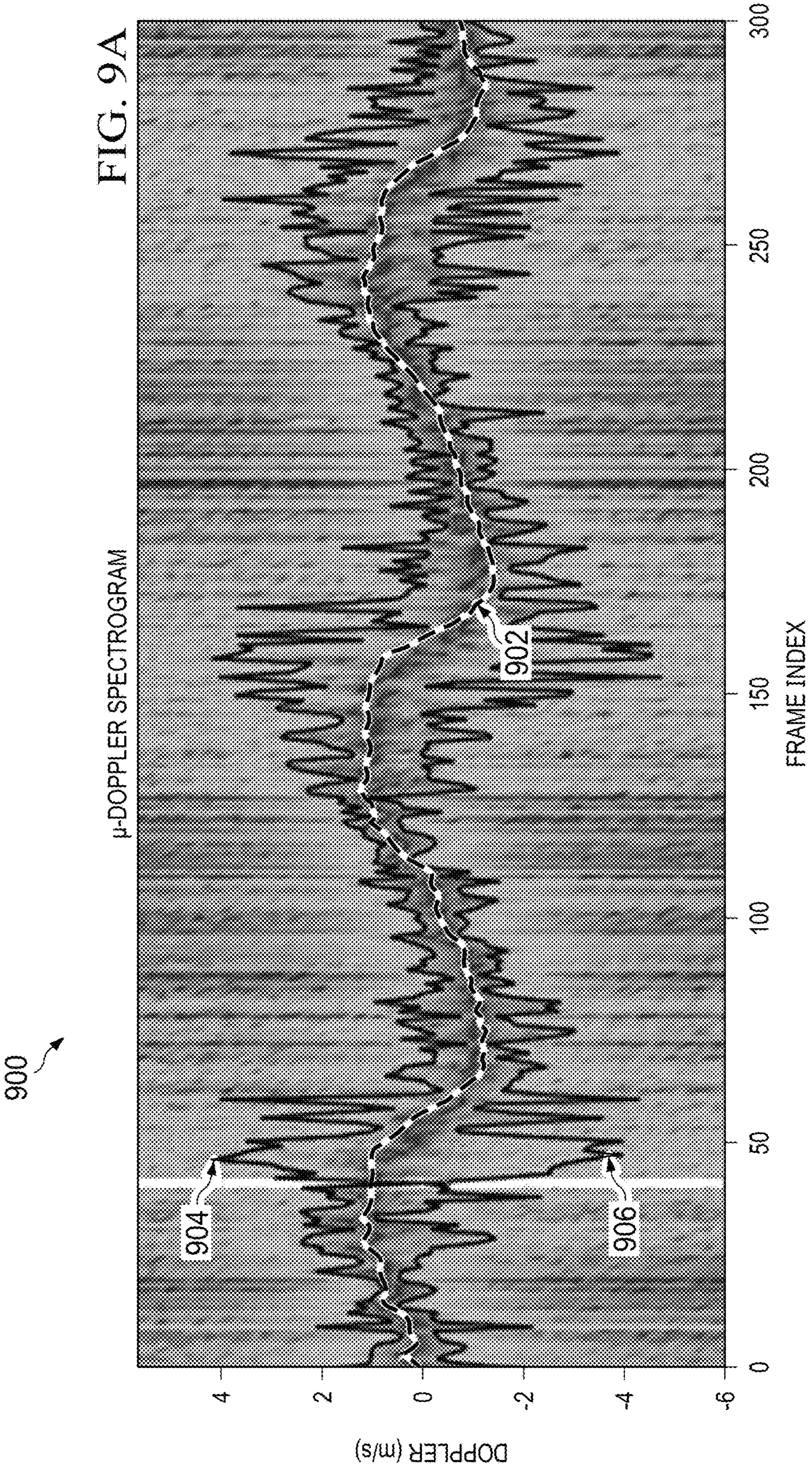
FIG. 9A is an example μ-Doppler spectrogram.
Figure 9B:
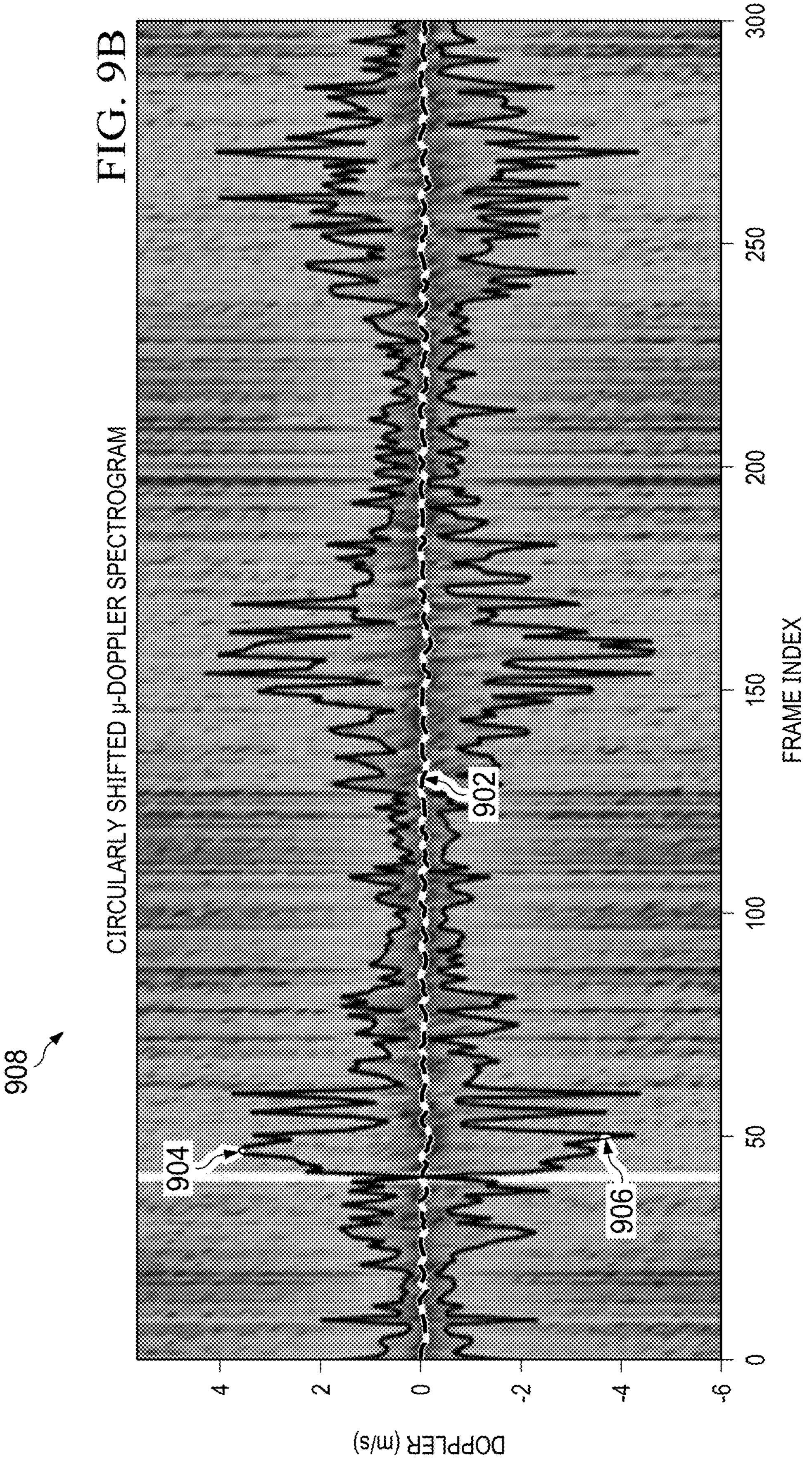
FIG. 9B is an example circularly shifted μ-Doppler spectrogram.

FIG. 8 is an example process 800 for generating a circularly shifted μ-Doppler spectrogram 908 (see FIGS. 9A and 9B). In step 802, the detection process uses the range FFT, Doppler FFT, and angle FFT information to determine the point cloud 128 (see step 112). In step 804 the tracking process determines the boundary boxes 704, centroids 706, and track velocities of the one or more objects corresponding to the point cloud 128 (see step 114).

In some examples, steps 806 through 814 are repeated per track (that is, per tracked object). In step 806, Doppler spectral information is extracted from frequency bins of the radar cube 126 that have range-angle bin indices within corresponding bounding boxes 704, for a given, iterated Doppler bin index.

In step 808, the Doppler spectral information extracted in step 806 is summed, so that sums corresponding to different Doppler bin indices within a bounding box 704 form corresponding Doppler-indexed frequency bins of a 1-D time slice of a μ-Doppler spectrogram 900. A 1-D time slice represents one data frame 216; the μ-Doppler spectrogram 900 corresponds to multiple 1-D time slices, representing multiple data frames 216. Different bounding boxes 704 are used to form different μ-Doppler spectrograms. Steps 806 and 808 are described by Equation 1, in which k is the Doppler frequency bin index, $X_{i,j}(k)$ is the Doppler FFT corresponding to range bin i and azimuth bin j, $N_{Doppler}$ is a value responsive to the PRF (the inverse of the PRI 212; as described above, this determines a maximum discernable Doppler range), and X(k) is a summed signal strength value (a summed energy value) in frequency bin k in the 1-D time slice of the μ-Doppler spectrogram 900:

$$X(k) = \sum_{i=i_{center}-n_{range}}^{i_{center}+n_{range}} \sum_{j=j_{center}-n_{azimuth}}^{j_{center}+n_{azimuth}} |X_{i,j}(k)| 0 \le k \le N_{Doppler} - 1 \quad \text{Equation 1}$$

In examples in which the bounding box 704 includes a Doppler dimension, $N_{Doppler}$ is the Doppler dimension size of the bounding box 704.

The magnitude of $X_{i,j}(k)$ is used because the μ-Doppler spectrogram 900 is determined using energy information without phase information. Doppler FFTs include information in a complex domain, corresponding to both energy and phase information. The magnitude operation extracts the energy information (in some examples, the square of the magnitude is used to provide power information).

In step 810, the 1-D time slices corresponding to a bounding box 704 (accordingly, to a tracked object across multiple data frames 216) are concatenated in time sequence to form 2-D μ-Doppler spectrograms 900. In some examples, step 810 is performed for each bounding box 704. In step 812, the 1-D time slices are circularly shifted around the track velocity 708 within respective 1-D time slices, and around the (spectrum-weighted) mean or median frequencies of the respective 1-D time slices, to form circularly shifted μ-Doppler spectrograms 908.

Circularly shifting increases or decreases Doppler indices of frequency bins by a selected amount; indices that are increased or decreased outside of the index range wrap around to the other side of the time slice (to the bottom or the top, respectively). Circularly shifting around the track velocity line 902 is performed so that a track centroid velocity bin is shifted to a frequency bin index that corresponds with zero meters per second (0 m/s). This results in the track velocity line 902 being aligned with the zero meters per second level. In some examples, circularly shifting around the track velocity line 902 also compensates for a limited Doppler visibility range of the FMCW radar system 400 (maximum amplitude Doppler values).

In some examples, circularly shifting around the weighted mean or median is performed to compensate for tracking process error in determining the centroid 706 or other tracking process errors, such as filter-related delay. Circularly shifting around the weighted mean or median normalizes the spectrum around a zero velocity with respect to the tracked object (for a μ-Doppler spectrogram 900) or a zero position with respect to the tracked object (for a μ-range spectrogram 1100). In some examples, circularly shifting around the mean or the median result in similar performance quality. Circular shifting as described reduces scenario dependency of training and classification data for a classifier, enabling use of a less complex classifier, and accordingly facilitating use of lower cost and/or lower power processing circuits.

In step 814, feature values are extracted from the circularly shifted μ-Doppler spectrograms 908 to form 1-D feature vectors. In some examples, different features are used to form different feature vectors; same features corresponding to different 1-D time slices for a tracked object form different cells within a feature vector corresponding to the respective feature; and spectrograms corresponding to different tracked objects are used to form different sets of feature vectors. In some examples, extracted feature values include normalized bandwidth power ($P_{BW}$), mean Doppler ($D_{mean}$), median Doppler ($D_{median}$), upper Doppler intercept ($D_{up}$), lower Doppler intercept ($D_{lo}$), and spectral entropy (H). In some examples, different features variously enable capture of signatures of different types of objects, such as a pedestrian, a bike, a pet, a drone, a bird, or a car. In some examples, an object signature includes rates and profiles of change of its motion or motions of its component features, such as bird wings or car wheels.

For example, $D_{up}$ defines an upper power envelope 904 and $D_{lo}$ defines a lower power envelope 906 within the circularly shifted μ-Doppler spectrogram 908. In some examples, $D_{up}$ and $D_{lo}$ enable distinguishing moving features such as arms and legs from blades of a fan. In some examples, FMCW radar systems have good velocity and range resolution, which facilitate generation of accurate, detailed, circularly shifted μ-Doppler spectrograms 908 and circularly shifted μ-range spectrograms 1108.

$P_{BW}$ is a portion of total power ($P_T$, summed signal return strength) in a 1-D time slice that is between an upper power boundary $P_2$ and a lower power boundary $P_1$. $P_2$ and $P_1$ are percentages that bracket a portion of the total power spectrum in a 1-D time slice of a circularly shifted μ-Doppler spectrogram 908. In an example, $P_2$ equals 0.99 (99% of $P_T$), and $P_1$ equals 0.01 (1% of $P_T$). $P_T$ is determined as shown in equation 2, in which S[n] equals the spectrum (signal strength) at an $n^{th}$ frequency bin in the Doppler domain, and $\Delta_D$ equals the width of a frequency bin in the Doppler domain (the inter-bin resolution, measured in, for example, m/s):

$$P_T = \sum_n S[n]\Delta_D \quad \text{Equation 2}$$

$P_{BW}$ is the amount of signal power within the portion of the 1-D time slice bracketed by $P_2$ and $P_1$. $P_{BW}$ is determined as shown in Equation 3:

$$P_{BW} = (P_2 - P_1) \times P_T \quad \text{Equation 3}$$

In some examples, $P_{BW}$ is normalized by dividing it by a normalization factor, such as 100.

$D_{mean}$ is a weighted mean Doppler value of the circularly shifted μ-Doppler spectrogram 908. Doppler values are weighted by corresponding signal strength. Doppler value is measured in, for example, m/s; see, for example, the vertical axis in FIG. 9B. $D_{mean}$ is given by Equation 4, in which D[n] is the Doppler value corresponding to the $n^{th}$ frequency bin in the Doppler domain (an $n^{th}$ frequency bin of the 1-D time slice), and $\hat{S}[n]$ equals $S[n]\Delta_D$:

$$D_{mean} = \left(\sum_n \hat{S}[n]D[n]\right) \Big/ P_T \quad \text{Equation 4}$$

$D_{median}$ is a Doppler value determined so that a cumulative power level across lower Doppler values equals a cumulative power level across higher Doppler values. $D_{median}$ is given by Equation 5, in which $N_{med}$ is a frequency bin index in the Doppler domain of the 1-D time slice that most nearly satisfies the expression, and $D[N_{med}]$ is the Doppler value at $N_{med}$:

$$D_{median} \doteq D[N_{med}], \sum_0^{N_{med}} S[n]\Delta_D \doteq P_T/2 \quad \text{Equation 5}$$

In some examples, $D[N_{med}]$ or $N_{med}$ can be used as features instead of (or in addition to) $D_{median}$.

$D_{up}$ is a Doppler value determined so that a cumulative power level across lower Doppler values equals the fraction of $P_T$ specified by $P_2$. Similarly, $D_{lo}$ is a Doppler value determined so that a cumulative power level across lower Doppler values equals the fraction of $P_T$ specified by $P_1$. Accordingly, the values of $D_{up}$ over time within the μ-Doppler spectrogram 900 trace an upper power envelope, and the values of $D_{lo}$ over time within the μ-Doppler spectrogram 900 trace a lower power envelope. $D_{up}$ and $D_{lo}$ are approximated by Equations 6 and 7, respectively, in which N1 and N2 are frequency bin indices that most nearly satisfy respective expressions:

$$D_{up} \doteq D[N1],\ P_2 \times P_T = \sum_0^{N1} S[n]\Delta_D \quad \text{Equation 6}$$

$$D_{lo} \doteq D[N2],\ P_1 \times P_T = \sum_0^{N2} S[n]\Delta_D \quad \text{Equation 7}$$

In some examples, D[N1] and D[N2], or N1 and N2, can be used as features instead of (or in addition to) $D_{up}$ and $D_{lo}$.

Spectral entropy H is a measure of spectral power distribution, that is, power distribution across the N frequency bins of a 1-D time slice. P[n] is a spectral power probability distribution used to determine H. P[n] is given as shown by Equation 8, and H is given as shown by Equation 9:

$$P[n] = S[n] \Big/ \sum_i S[i] \quad \text{Equation 8}$$

$$H = -\left(\sum_{n=1}^{N} P[n]\log_2 P[n]\right) \Big/ \log_2 N \quad \text{Equation 9}$$

In Equation 8, n indexes a 1-D time slice and i iterates across the time range of 1-D time slices.

In some examples, prior to extracting the features as described with respect to Equations 2 through 9, the power levels within the spectrum (in the 1-D time slice) are normalized between zero and one to reduce or eliminate effects of signal-to-noise ratio (SNR). In some examples, additional, fewer, or different features can be extracted from a circularly shifted μ-Doppler spectrogram 908.

In some examples, additional features to be extracted from a circularly-shifted μ-Doppler spectrogram 908 include an envelope bandwidth BW, an envelope offset (Offset), standard deviation (σ), skewness, kurtosis, root-mean-square (RMS), peak magnitude to RMS ratio, and peak magnitude to average magnitude ratio. BW equals a maximum value of $D_{up}$ minus a minimum value of $D_{lo}$. Offset equals a mean value of $D_{up}$ minus a mean value of $D_{lo}$ within the μ-Doppler spectrogram 900. Skewness is a measure of the asymmetry of the power data around the sample mean. Kurtosis is a measure of how outlier-prone the power distribution is. In some examples, RMS is determined in the frequency domain using Parseval's theorem.

FIG. 9A is an example μ-Doppler spectrogram 900. A vertical axis corresponds to frequency bin indices in the Doppler domain, and a horizontal axis corresponds to time. The example μ-Doppler spectrogram 900 represents a human walking towards and away from the FMCW radar system 400. The μ-Doppler spectrogram 900 includes a track velocity line 902 representing the predicted motion vector of the centroid 706, an upper envelope line 904 defined by values of $D_{up}$ over time, and a lower envelope line 906 defined by values of $D_{lo}$ over time. Gross motion of the walking human can be seen in the track velocity line 902 fluctuating between approximately one meter per second and approximately negative one meter per second.

FIG. 9B is an example circularly shifted μ-Doppler spectrogram 908. A vertical axis corresponds to frequency bin indices in the Doppler domain, and a horizontal axis corresponds to time. Gross motion of the walking human—the centroid 706 repeatedly approaching and then receding from the FMCW radar system 400—is reduced or eliminated by the circular shifting. In some examples, power distribution of the circularly shifted μ-Doppler spectrogram 908 is characteristic of a walking human (or other object, such as a fan), rather than a particular case corresponding to a particular direction and rate of walk (or of another type of movement, such as rotation of a fan head perpendicular to an axis of rotation of the fan blades).

Figure 10:
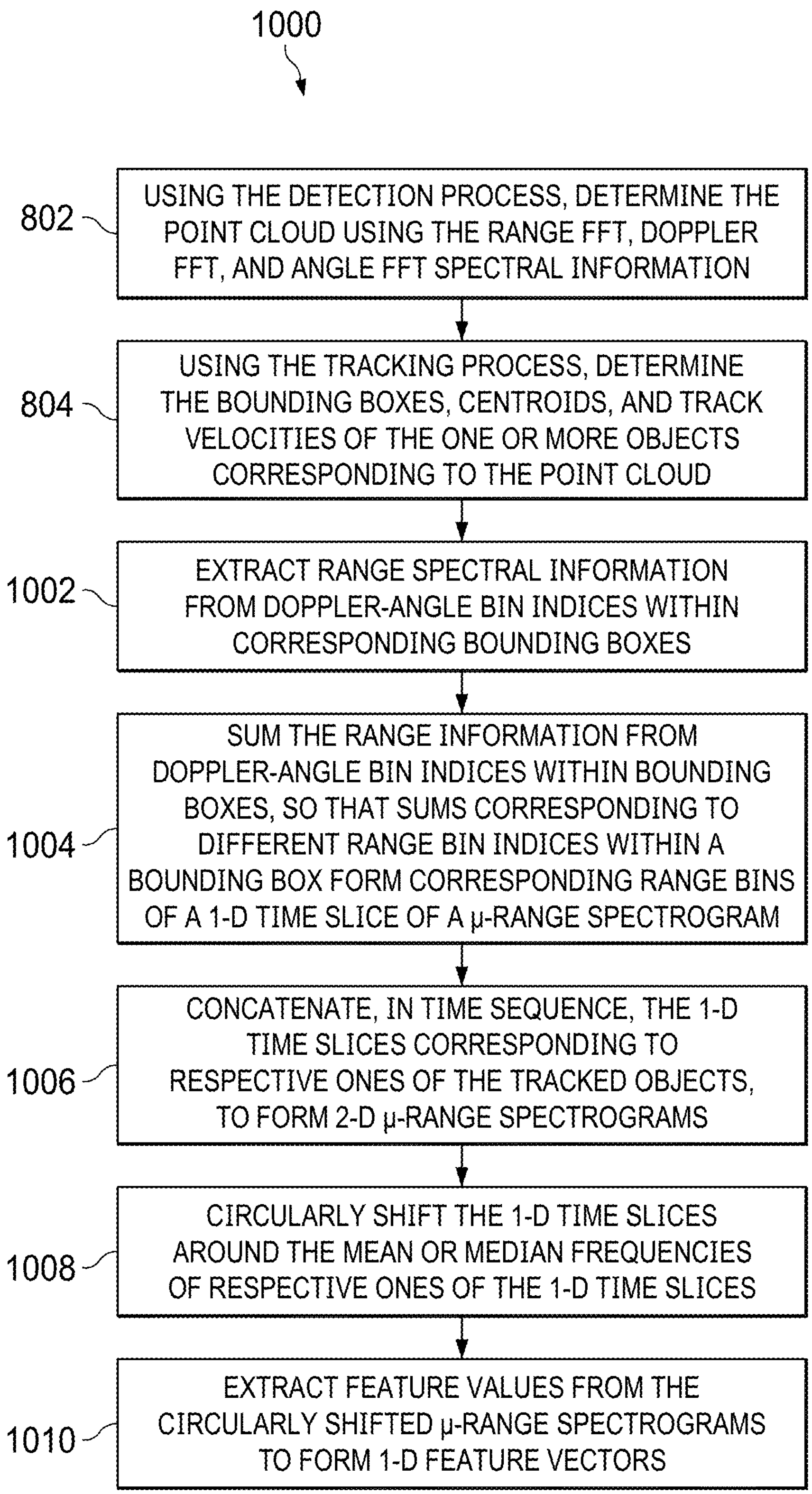
FIG. 10 is an example process for generating a circularly shifted μ-range spectrogram.

FIG. 10 is an example process 1000 for generating a circularly shifted μ-range spectrogram 1108 (see FIG. 1B). In some examples, steps 1002 through 1010 are repeated per track (that is, per tracked object). Following operation of the detection and tracking processes in steps 802 and 804, in step 1002, range spectral information is extracted from frequency bins of the radar cube 126 that have Doppler-angle bin indices within corresponding boundary boxes 704, for a given, iterated range bin index. In step 1004, the range spectral information extracted in step 1002 is summed, so that sums corresponding to different range bin indices within a bounding box 704 form corresponding range-indexed frequency bins of a 1-D time slice of a μ-range spectrogram. Different bounding boxes 704 are used to form different μ-range spectrograms. Steps 1002 and 1004 are described by Equation 10, in which i is the range frequency bin index, $X_{j,k}(i)$ is the range FFT corresponding to Doppler bin j and azimuth bin k, $N_{range}$ is a range dimension size of the bounding box 704, and X(i) is a summed signal strength value in frequency bin i in the 1-D time slice of the μ-range spectrogram 1100:

$$X(i) = \sum_{j=j_{center}-n_{Doppler}}^{j_{center}+n_{Doppler}} \sum_{k=k_{center}-n_{azimuth}}^{k_{center}+n_{azimuth}} |X_{j,k}(i)| \, 0 \le i \le N_{range}-1 \quad \text{Equation 10}$$

In step 1006, the 1-D time slices corresponding to a bounding box 704 (a tracked object) are concatenated, in time sequence, to form 2-D μ-range spectrograms 1100. In some examples, step 1006 is performed for each bounding box 704. In step 1008, the 1-D time slices are circularly shifted around the mean or median frequencies of the respective 1-D time slices to form a circularly shifted μ-range spectrograms 1108.

In step 1010, feature values are extracted from the circularly shifted μ-range spectrograms 1108 to form 1-D feature vectors. The same set of features are extracted from the circularly shifted μ-range spectrograms 1108 as from the circularly shifted μ-Doppler spectrograms 908: normalized bandwidth power ($P_{BW}$), mean Doppler ($D_{mean}$), median Doppler ($D_{median}$), upper Doppler intercept ($D_{up}$), lower Doppler intercept ($D_{lo}$), and spectral entropy (H). Equations 2 through 9 are used to determine these features, using values from the range domain rather than the Doppler domain.

In some examples, prior to extracting features as described with respect to Equations 2 through 9, the power levels within the spectrum (in the 1-D time slice) are normalized between zero and one to reduce or eliminate effects of signal-to-noise ratio (SNR). In some examples, additional, fewer, or different features can be extracted from a circularly shifted μ-range spectrogram 1108. Examples of other features that can be extracted are described above with respect to FIG. 8.

Figure 11A:
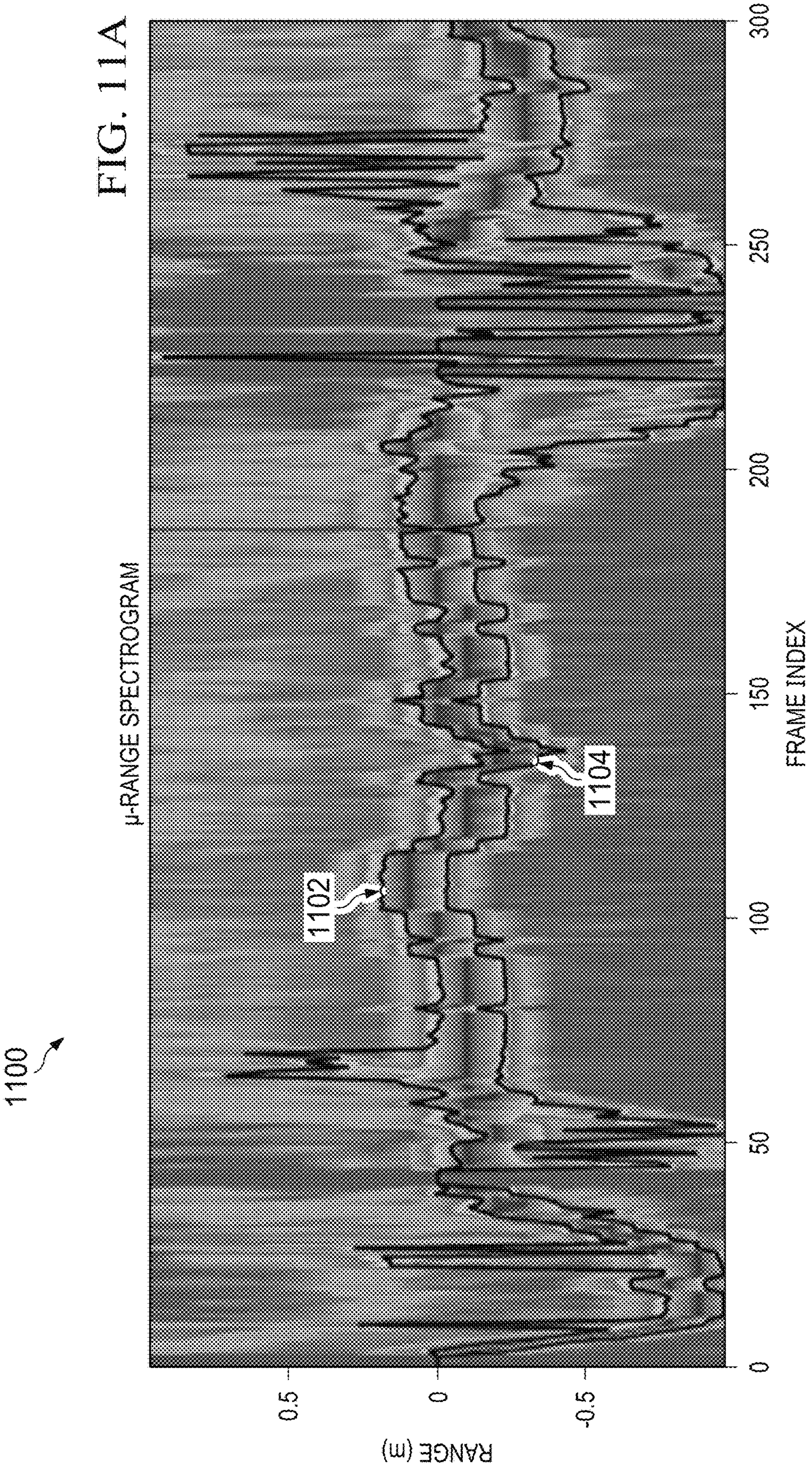
FIG. 11A is an example μ-range spectrogram.

FIG. 11A is an example μ-range spectrogram 1100. The example μ-range spectrogram 1100 represents an operating fan (blades rotating, stationary fan). The μ-range spectrogram 900 is generated around the target centroid 706. Accordingly, a vertical axis represents distance from the centroid 706, so that zero distance is located at the centroid 706. Also, a horizontal axis represents time. The μ-range spectrogram 1100 includes an upper envelope line 1102 defined by values of $D_{up}$ over time, and a lower envelope line 1104 defined by values of $D_{lo}$ over time. $D_{up}$ and $D_{lo}$ are determined as described with respect to Equations 6 and 7 using μ-range spectrogram 1100 power levels. In some examples, the determination of the centroid 706 by the tracking process is inaccurate, as can be seen by the wide variation over time in the range to the region between the upper envelope line 1102 and the lower envelope line 1104.

Figure 11B:
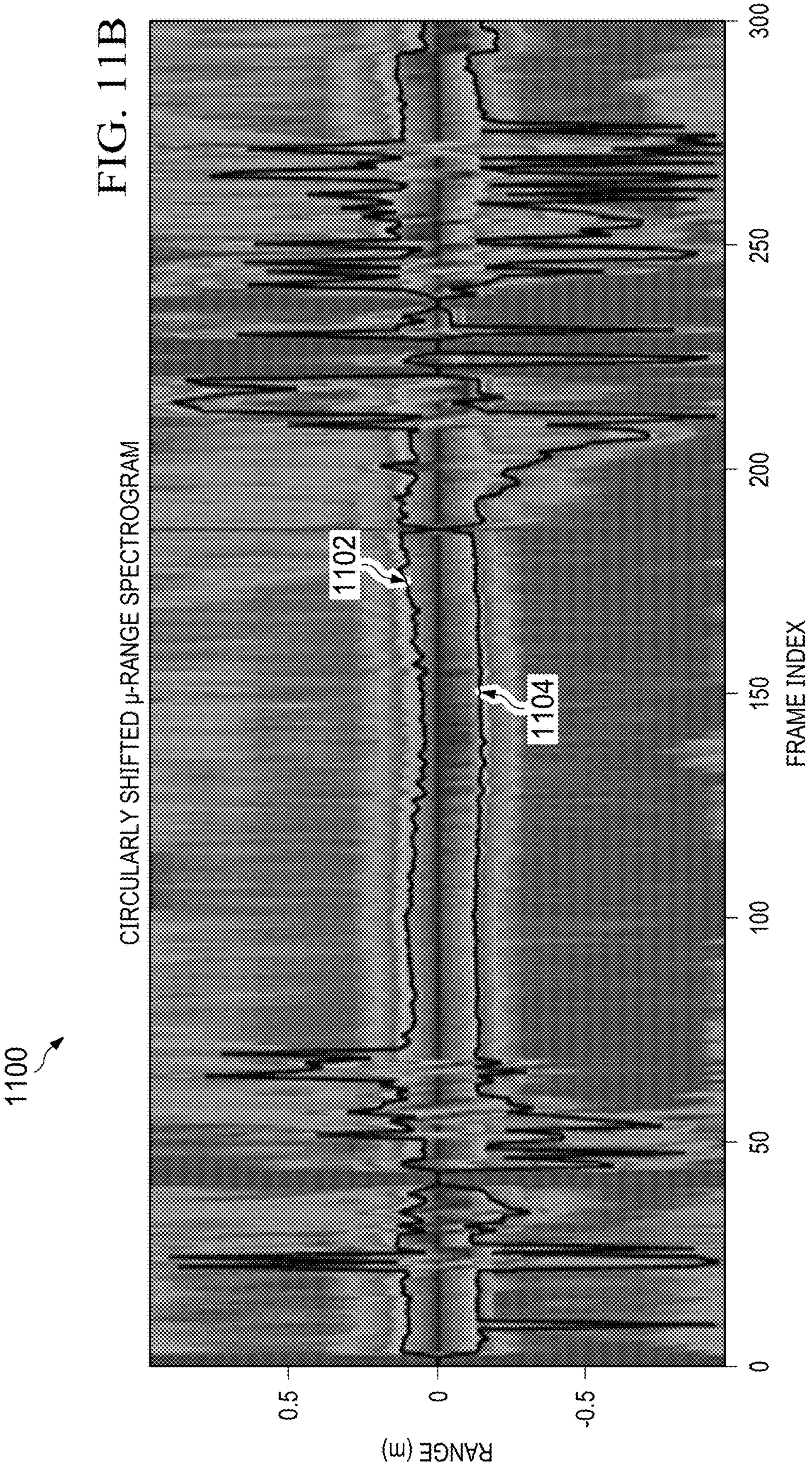
FIG. 11B is an example circularly shifted μ-range spectrogram.

FIG. 11B is an example circularly shifted μ-range spectrogram 1108. In the illustrated example, the μ-range spectrogram 1100 has been shifted around a median line corresponding to values of $D_{median}$ over time to generate the circularly shifted μ-range spectrogram 1108. $D_{median}$ is determined as described with respect to Equation 5. In some examples, circularly shifting around the median line (or a mean line, corresponding to values of $D_{mean}$ over time determined using Equation 4) improves alignment of the region between the upper and lower envelope lines 1102 and 114 with a zero distance. In some examples, this corresponds to improved alignment of frequency bins corresponding to a physical centroid of the tracked object with a zero distance.

Figure 12:
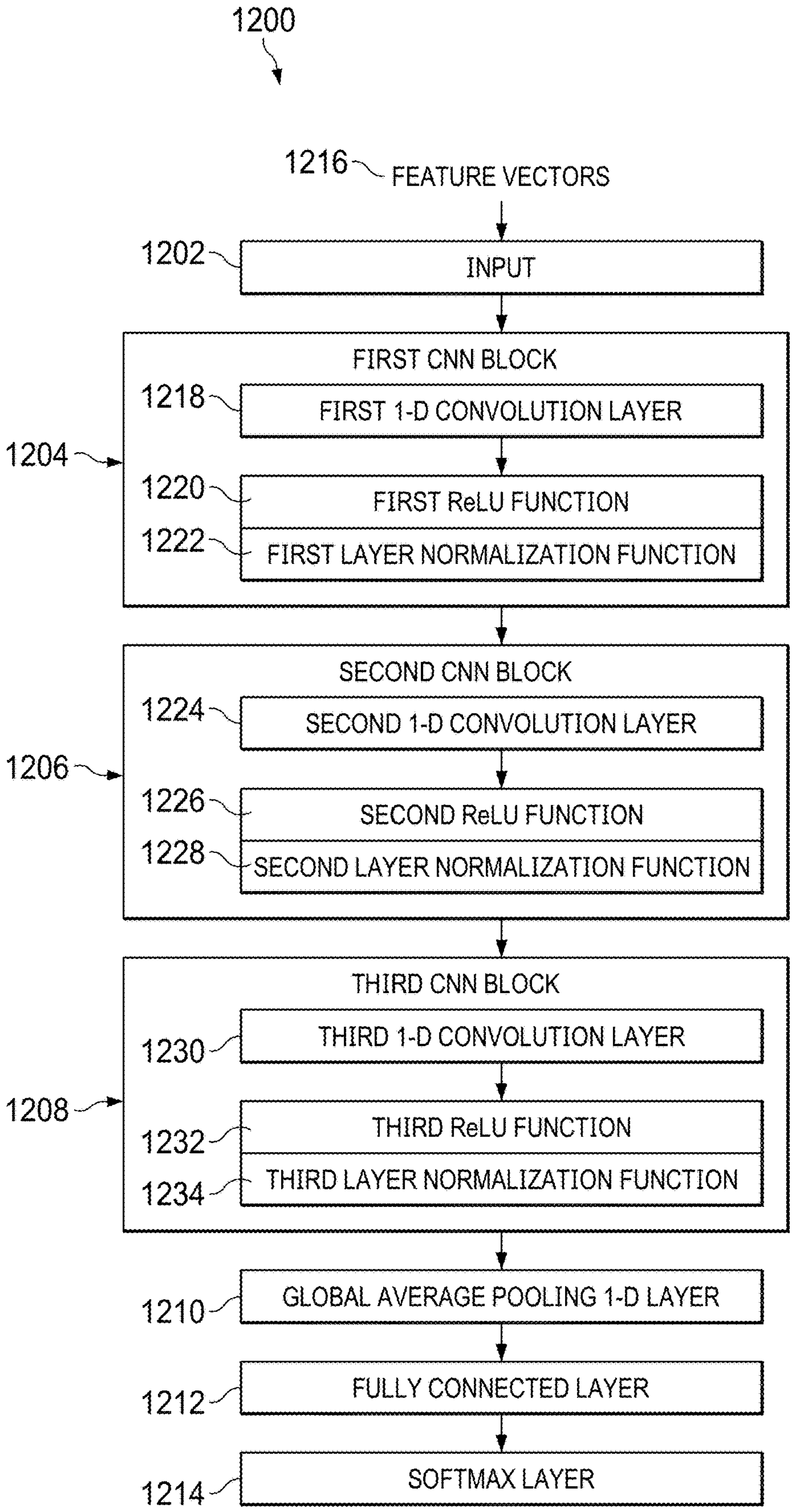
FIG. 12 is an example CNN design for performing radar-based multiple target classification.

FIG. 12 is an example CNN design 1200 for performing radar-based multiple target classification. In the illustrated example, the CNN design 1200 includes, in order of process flow, an input 1202, a first CNN block 1204, a second CNN block 1206, a third CNN block 1208, a global average pooling 1-D layer 1210, a fully connected layer 1212, and a softmax layer 1214. The input 1202 receives feature vectors 1216 to be processed, and passes them to the first CNN block 1204. The first CNN block 1204 includes a first 1-D convolution layer 1218, a first rectified linear unit (ReLU) function 1220, and a first layer normalization function 1222. In some examples, the first 1-D convolution layer uses sixteen filter kernels. The second CNN block 1206 includes a second 1-D convolution layer 1224, a second ReLU function 1226, and a second layer normalization function 1228. In some examples, the second 1-D convolution layer uses thirty-two filter kernels. The third CNN block 1208 includes a third 1-D convolution layer 1230, a third ReLU function 1232, and a third layer normalization function 1234.

In some examples, a trainable classification network can include more, fewer, or different functional blocks. In some examples, functional blocks are selected in response to an accuracy and/or a processing time of the trainable classification network.

Figure 13:
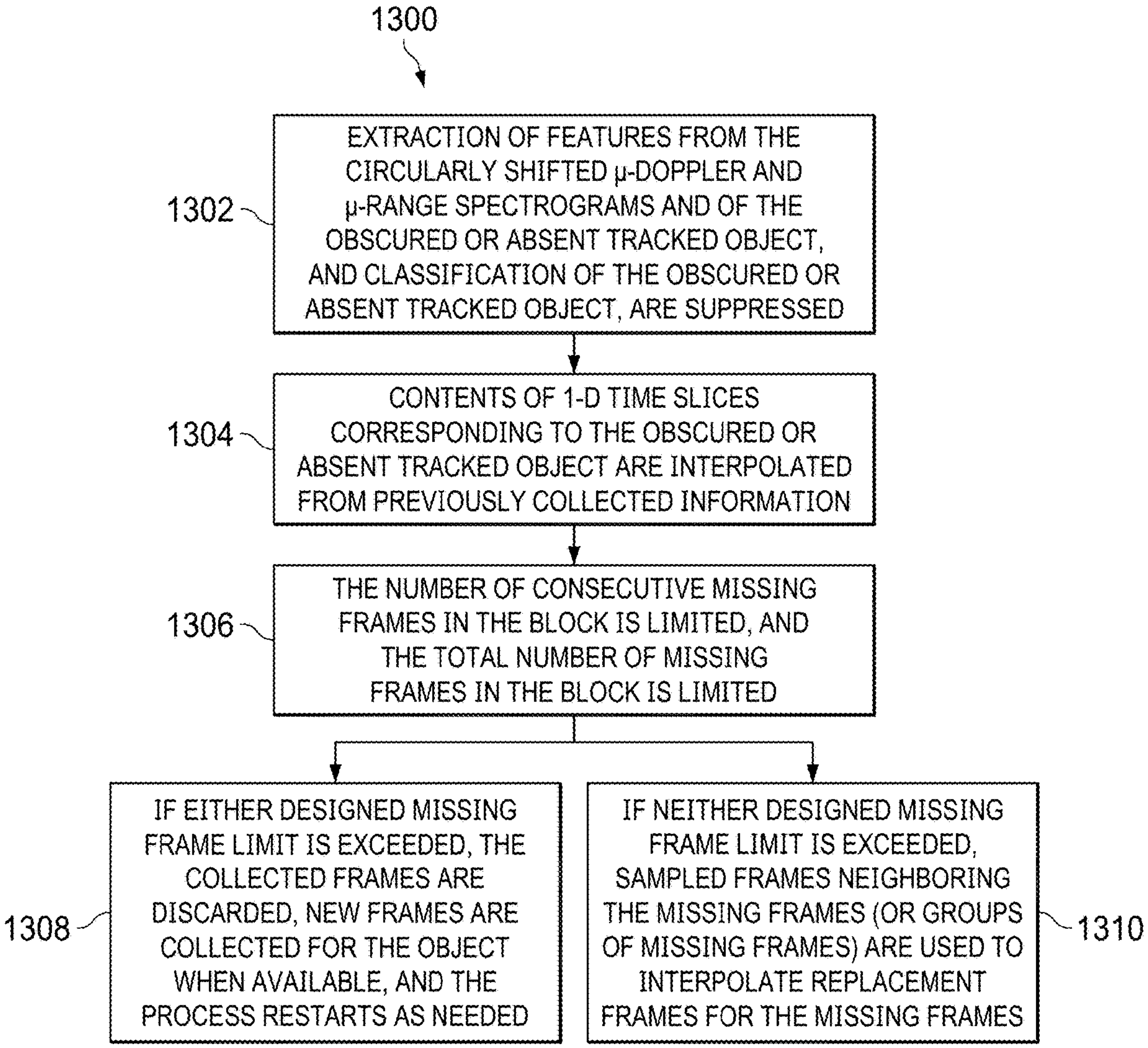
FIG. 13 is an example process for handling data frames during which a tracked object is obscured.

FIG. 13 is an example process 1300 for handling data frames during which a tracked object is obscured. In some examples, a tracked object may have no associated points 702 in the point cloud 128 during one or more data frames 216. This can be caused by the tracked object exiting the FOV of the FMCW radar system 400, or by the tracked object being obscured by another tracked object. In some examples, the tracking process continues to track an obscured or absent tracked object based on predictions made using data collected prior to the tracked object becoming obscured or absent. In some examples, a tracked object having no associated points 702 in the point cloud 128 during one or more data frames 216 can cause a corresponding μ-Doppler spectrogram or μ-range spectrogram to have 1-D time slices that include partial or no Doppler or range data (respectively).

Steps 1302 et seq. are performed in response to data frames 216 corresponding to a tracked object having a number of associated points 702 in the point cloud 128 less than a defined threshold. In step 1302, extraction of features from the circularly shifted μ-Doppler and μ-range spectrograms 908 and 1108 of the obscured or absent tracked object, and classification of the obscured or absent tracked object, are suppressed. This is done because extracted features would be unreliable. Extraction of features and classification resume once new 1-D time slices can be generated from points 702 in the point cloud 128 corresponding to the tracked object. In step 1304, contents of 1-D time slices corresponding to the obscured or absent tracked object are interpolated from previously collected information. That is, 1-D time slices corresponding to the tracked object being missing are not discarded.

In step 1306, it is determined whether either the number of consecutive missing frames in a block exceeds a designed limit, or the total number of missing frames in the block exceeds a designed limit. The block is the total timing window over which 1-D time slices generated from range-Doppler FFTs 420 are concatenated to form a circularly shifted μ-Doppler spectrogram 908. In some examples, missing frames in excess of the consecutive or total limit can cause interpolation to replace the missing frames to not be robust. In some examples, interpolation can be performed robustly where there are not missing frames in excess of the consecutive or total limit, and where there are neighboring frames to sample before and after the missing frames. In some examples, missing frame limits include a number of missing frames not recoverable using interpolation from neighboring frames. In step 1308, if either designed missing frame limit is exceeded, the collected frames are discarded, new frames are collected for the object when available, and the process 1300 restarts as needed.

In step 1310, if neither designed missing frame limit is exceeded, sampled frames neighboring the missing frames (or groups of missing frames) are used to interpolate replacement frames for the missing frames. In some examples, interpolation is not performed for missing samples that border, or are contiguously adjacent to, the beginning or end (an edge) of the block. In some examples, after a tracked object is missing for a defined amount of time, the tracking process will stop tracking the object.

In some examples, the typical block length can change. A block can have a duration of, for example, four seconds. Longer block durations enables collation of more data, corresponding to more 1-D slices in μ-Doppler and μ-range spectrograms 908 and 1108, enabling increased training set quality or classification accuracy at the cost of corresponding latency. Conversely, shorter block durations enable faster classification, at the cost of reduced accuracy. In some examples, the block length is between twenty and forty data frames 216.

Figure 14:
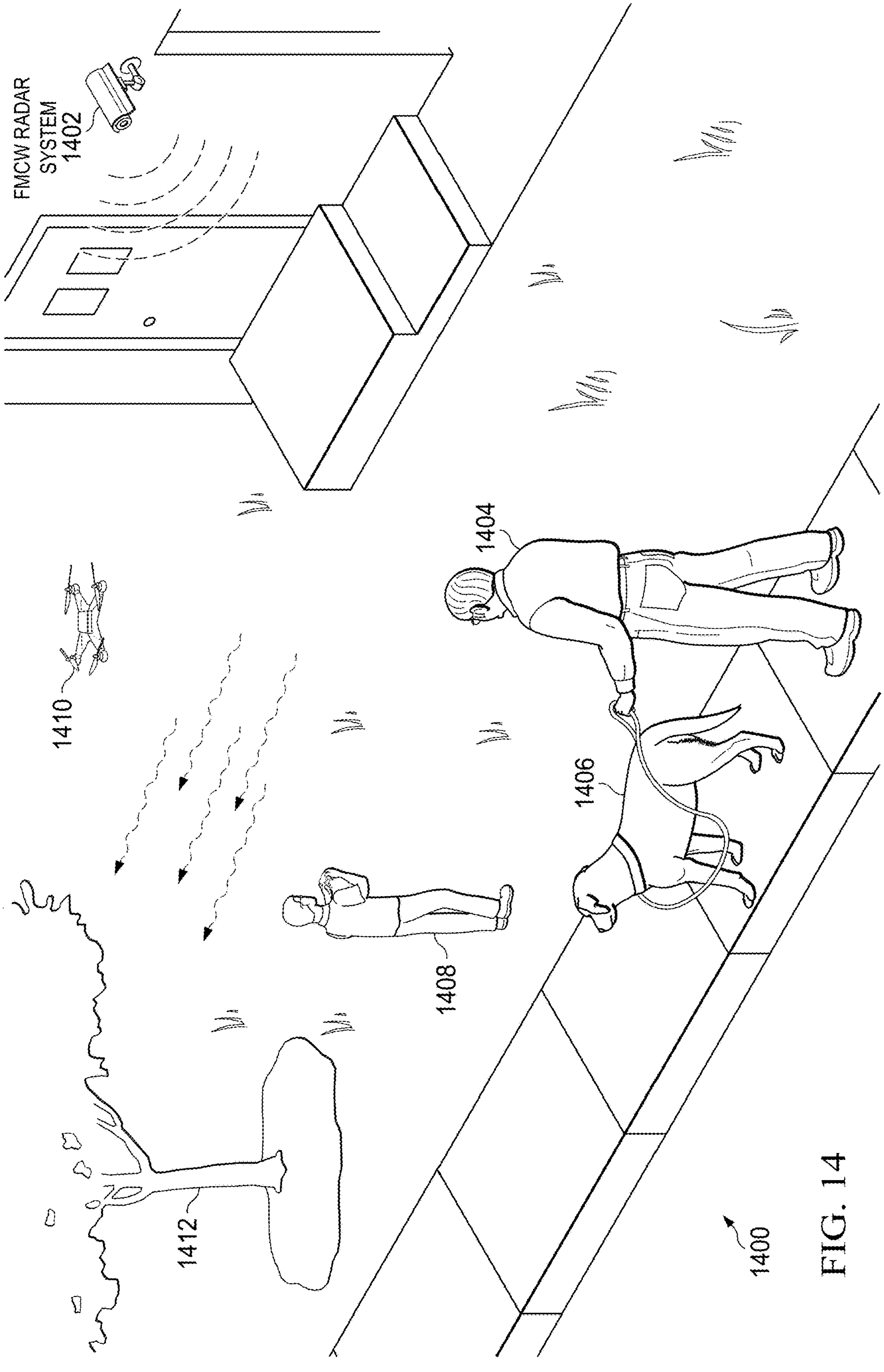
FIG. 14 is an illustration of an example FMCW radar system and its FOV.

FIG. 14 is an illustration 1400 of an example FMCW radar system 1402 and its FOV. The FOV of the FMCW radar system 1402 includes an adult 1404 walking a dog 1406, a child 1408 playing with a drone 1410, and a tree 1412, each of which are objects in range 422 of the FMCW radar 1402. As described above, the FMCW radar system 1402 will separately track each of the objects in range 422, generate different circularly shifted μ-Doppler and μ-range spectrograms 908 and 1108 for the different objects in range 422 (corresponding to different centroids 706 and bounding boxes 704). The FMCW radar system 1402 will then extract different sets of 1-D feature vectors from the different μ-Doppler and μ-range spectrograms 908 and 1108, so that different sets of 1-D feature vectors correspond to different ones of the object in range 422. The FMCW radar system 1402 classifies different ones of the objects in range 422 in response to the respective set of 1-D feature vectors corresponding to the object in range 422.

Modifications are possible in the described embodiments, and other embodiments are possible, within the scope of the claims.

In some examples, an IF signal amplification stage, other than a bandpass filter with a variable gain amplifier, is used.

In some examples, a linear shift is used instead of or in addition to a circular shift.

In some examples, different features are extracted from a (circularly shifted) μ-range spectrogram than from a (circularly shifted) μ-Doppler spectrogram.

In some examples, feature extraction to form 1-D feature vectors can be referred to as extracting a subset of the information contained by a corresponding μ-range spectrogram or μ-Doppler spectrogram.

In some examples, $D_{median}$ can be determined other than as described with respect to Equation 5.

In some examples, methods and structures described herein are used in automotive radar to classify objects around a vehicle. In some examples, methods and structures described herein are used inside a vehicle or other structure to detect and classify occupants. In some examples, methods and structures described herein are used in building automation or surveillance for motion classification, such as to distinguish people, pets, trees, etc. In some examples, methods and structures described herein are used in elderly care for fall detection or activity classification. In some examples, methods and structures described herein are used in gesture recognition, such as for an automotive dashboard, mobile devices, household appliances, or automotive or other door or trunk opening.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (for example, programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including multiple functional blocks may instead include only the functional blocks within a single physical device (for example, a semiconductor die and/or integrated circuit (IC) package) and may be adapted to be coupled to at least some of the functional blocks to form the described structure either at a time of manufacture or after a time of manufacture, for example, by an end-user and/or a third-party.

Circuits described herein are reconfigurable to include the replaced components to provide functionality at least partially similar to functionality available prior to the component replacement.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

While certain elements of the described examples may be included in an IC and other elements are external to the IC, in other examples, additional or fewer features may be incorporated into the IC. In addition, some or all of the features illustrated as being external to the IC may be included in the IC and/or some features illustrated as being internal to the IC may be incorporated outside of the IC. As used herein, the term "IC" means one or more circuits that are: (i) incorporated in/over a semiconductor substrate; (ii) incorporated in a single semiconductor package; (iii) incorporated into the same module; and/or (iv) incorporated in/on the same PCB.

Unless otherwise stated, "about," "approximately," or "substantially" preceding a value means+/−10 percent of the stated value, or, if the value is zero, a reasonable range of values around zero.

What is claimed is:

1. A method, comprising:

receiving a signal;

estimating, using a processing circuit, a range spectrum, a Doppler spectrum, and an angle spectrum of the signal to generate a radar cube;

detecting, using the processing circuit, a point cloud corresponding to the radar cube;

tracking, using the processing circuit, one or more tracked objects corresponding to the point cloud, to generate a centroid, a boundary, and a track velocity for each tracked object of the one or more tracked objects;

generating, using the processing circuit, a micro-Doppler spectrogram for each tracked object of the one or more tracked objects;

generating, using the processing circuit, a micro-range spectrogram for each tracked object of the one or more tracked objects;

performing a circular shift operation, using the processing circuit, the circular shift operation including at least one of:

circularly shifting the micro-Doppler spectrogram of a first tracked object of the one or more tracked objects around the track velocity of the first tracked object; and circularly shifting the micro-range spectrogram or the micro-Doppler spectrogram of the first tracked object around mean or median frequencies; and classifying, using the processing circuit, the first tracked object based on the circular shift operation.

2. The method of claim 1, wherein generating the micro-Doppler spectrogram of the first tracked object includes summing signal strengths in range-angle indices of the boundary of the first tracked object to generate range-angle sums, so that range-angle sums corresponding to different Doppler indices of the boundary correspond to different frequency bins of a one dimensional time slice of the micro-Doppler spectrogram of the first tracked object; and wherein generating the micro-range spectrogram of the first tracked object includes summing signal strengths in Doppler-angle indices of the boundary of the first tracked object to generate Doppler-angle sums, so that Doppler-angle sums corresponding to different range indices of the boundary correspond to different frequency bins of the one dimensional time slice of the micro-range spectrogram of the first tracked object.

3. The method of claim 1, wherein the circular shift operation includes circularly shifting, using the processing circuit, the micro-Doppler spectrogram of the first tracked object around the track velocity of the first tracked object.

4. The method of claim 1, wherein the circular shift operation includes circularly shifting, using the processing circuit, the micro-range spectrogram or the micro-Doppler spectrogram for the first tracked object around the mean frequencies or median frequencies, weighted by spectral power of respective frequency bins, of corresponding one dimensional time slices of the micro-range spectrogram or the micro-Doppler spectrogram for the first tracked object, to generate a circularly shifted micro-range spectrogram or a micro-Doppler spectrogram for the first tracked object;

wherein the classifying of the first tracked object is performed based on the circularly shifted micro-range spectrogram or the circularly shifted micro-Doppler spectrogram for the first tracked object.

5. The method of claim 1, further comprising extracting, using the processing circuit, feature values from the micro-Doppler spectrogram for the first tracked object to form one dimensional feature vectors, and performing the classifying of the first tracked object based on the one dimensional feature vectors.

6. The method of claim 5, wherein the features extracted to form the one dimensional feature vectors include one or more of: a normalized bandwidth power, a mean Doppler, a median Doppler, an upper Doppler intercept, a lower Doppler intercept, or a spectral entropy.

7. The method of claim 1, further comprising interpolating spectral values of a missing data frame with respect to the first tracked object based on the tracking identifying fewer than a threshold number of points corresponding to the first tracked object in the point cloud for the missing data frame, wherein the interpolating is performed based on spectral values of data frames that are adjacent to the missing data frame.

8. A method, comprising:

receiving a signal;

estimating, using a processing circuit, a range spectrum, a Doppler spectrum, and an angle spectrum of the signal to generate a radar cube;

detecting, using the processing circuit, a point cloud corresponding to the radar cube;

tracking, using the processing circuit, one or more tracked objects corresponding to the point cloud, to generate a centroid, a boundary, and a track velocity for each tracked object of the one or more tracked objects;

generating, using the processing circuit, a micro-Doppler spectrogram for each tracked object of the one or more tracked objects;

circularly shifting, for each tracked object of the one or more tracked objects, the micro-Doppler spectrogram around the track velocity or around a mean frequency or a median frequency, to form a circularly shifted micro-Doppler spectrogram for each tracked object of the one or more tracked objects; and classifying, using the processing circuit, each tracked object of the one or more tracked objects based on the circularly shifted micro-Doppler spectrogram corresponding to the tracked object;

wherein, for each micro-Doppler spectrogram for the one or more tracked objects, the mean frequency or the median frequency is weighted by spectral power of respective frequency bins of corresponding one dimensional time slices.

9. The method of claim 8, wherein generating the micro-Doppler spectrogram of a first tracked object of the one or more tracked objects includes summing signal strengths in range-angle indices of the boundary of the first tracked object to generate range-angle sums, so that range-angle sums corresponding to different Doppler indices of the boundary correspond to different frequency bins of a one dimensional time slice of the micro-Doppler spectrogram of the first tracked object.

10. The method of claim 9, further comprising generating a micro-range spectrogram of the first tracked object by summing signal strengths in Doppler-angle indices of the boundary of the first tracked object to generate Doppler-angle sums, so that Doppler-angle sums corresponding to different range indices of the boundary correspond to different frequency bins of the one dimensional time slice of the micro-range spectrogram of the first tracked object;

wherein the classifying of the first tracked object is performed based on the micro-range spectrogram of the first tracked object.

11. The method of claim 10, further comprising circularly shifting, using the processing circuit, the micro-range spectrogram for the first tracked object around mean frequencies or median frequencies, weighted by spectral power of respective frequency bins, of corresponding one dimensional time slices of the micro-range spectrogram for the first tracked object, to generate a circularly shifted micro-range spectrogram for the first tracked object;

wherein the classifying of the first tracked object is performed based on the circularly shifted micro-range spectrogram for the first tracked object.

12. The method of claim 11, further comprising extracting, using the processing circuit, feature values from the circularly shifted micro-Doppler spectrogram for the first tracked object to form one dimensional feature vectors, and performing the classifying of the first tracked object based on the one dimensional feature vectors.

13. The method of claim 12, wherein the features extracted to form the one dimensional feature vectors include one or more of: a normalized bandwidth power, a mean Doppler, a median Doppler, an upper Doppler intercept, a lower Doppler intercept, or a spectral entropy.

14. The method of claim 8, further comprising interpolating spectral values of a missing data frame with respect to a first tracked object of the one or more tracked objects based on the tracking identifying fewer than a threshold number of points corresponding to the first tracked object in the point cloud for the missing data frame, wherein the interpolating is performed based on spectral values of data frames that are adjacent to the missing data frame.

15. A method, comprising:

receiving a signal;

estimating, using a processing circuit, a range spectrum, a Doppler spectrum, and an angle spectrum of the signal to generate a radar cube;

detecting, using the processing circuit, a point cloud corresponding to the radar cube;

tracking, using the processing circuit, one or more tracked objects corresponding to the point cloud, to generate a centroid, a boundary, and a track velocity for each tracked object of the one or more tracked objects;

generating, using the processing circuit, a micro-Doppler spectrogram for each tracked object of the one or more tracked objects;

circularly shifting, using the processing circuit, the micro-Doppler spectrogram for a first tracked object of the one or more tracked objects around mean frequencies or median frequencies, weighted by spectral power of respective frequency bins, of corresponding one dimensional time slices of the micro-Doppler spectrogram of the first tracked object, to generate a circularly shifted micro-Doppler spectrogram for the first tracked object;

extracting, using the processing circuit, feature values from each micro-Doppler spectrogram to form a corresponding set of one dimensional feature vectors; and classifying, using the processing circuit, each tracked object of the tracked objects of the one or more tracked objects based on the set of one dimensional feature vectors of the tracked object.

16. The method of claim 15, wherein the features extracted to form the one dimensional feature vectors include one or more of: a normalized bandwidth power, a mean Doppler, a median Doppler, an upper Doppler intercept, a lower Doppler intercept, or a spectral entropy.

17. The method of claim 15, wherein the extracting, for the first tracked object, is performed to extract feature values from the circularly shifted micro-Doppler spectrogram for the first tracked object.

18. The method of claim 15, further comprising interpolating spectral values of a missing data frame with respect to the first tracked object based on the tracking identifying fewer than a threshold number of points corresponding to the first tracked object in the point cloud for the missing data frame, wherein the interpolating is performed based on spectral values of data frames that are adjacent to the missing data frame.

19. A method, comprising:

receiving a signal;

estimating, using a processing circuit, a range spectrum, a Doppler spectrum, and an angle spectrum of the signal to generate a radar cube;

detecting, using the processing circuit, a point cloud corresponding to the radar cube;

tracking, using the processing circuit, multiple tracked objects corresponding to the point cloud, to generate a different centroid, boundary, and track velocity with respect to different ones of the multiple tracked objects;

generating multiple micro-Doppler spectrograms for the multiple tracked objects, respectively;

performing a circular shift operation on each of the micro-Doppler spectrograms for the corresponding tracked object to generate multiple circularly shifted micro-Doppler spectrograms;

classifying, using the processing circuit, the multiple tracked objects based on the multiple circularly shifted micro-Doppler spectrograms.

20. An integrated circuit, comprising:

a mixer including an input and an output, and configured to receive a frequency modulated continuous wave (FMCW) signal, the mixer configured to provide an intermediate frequency (IF) signal to its output in response to the FMCW signal;

a IF amplifier (IFA) including an input and an output, the input of the IFA coupled to the output of the mixer, the IFA configured to provide signal samples to its output in response to the IF signal;

a memory circuit; and a processing circuit including an input coupled to the output of the IFA, the processing circuit coupled to communicate with the memory circuit;

the memory circuit storing instructions that, when executed, are configured to cause the processing circuit to perform:

estimating a range spectrum, a Doppler spectrum, and an angle spectrum of the signal samples to generate a radar cube;

detecting a point cloud corresponding to the radar cube;

tracking one or more tracked objects corresponding to the point cloud, to generate a centroid, a boundary, and a track velocity for each tracked object of the one or more tracked objects;

generating a micro-Doppler spectrogram for each tracked object of the one or more tracked objects;

performing one or more of:

generating a micro-range spectrogram for each tracked object of the one or more tracked objects;

circularly shifting, for each tracked object of the one or more tracked objects, the micro-Doppler spectrogram around the track velocity or around a mean frequency or a median frequency, to form a circularly shifted micro-Doppler spectrogram for each tracked object of the one or more tracked objects; or extracting, using the processing circuit, feature values from the micro-Doppler spectrogram for each tracked object to form sets of one dimensional feature vectors; and classifying, using the processing circuit, the one or more tracked objects based on the generating and the performing.

* * * * *